(12) United States Patent
Toyoyama et al.

(10) Patent No.: US 7,545,831 B2
(45) Date of Patent: Jun. 9, 2009

(54) TRANSMISSION DEVICE FOR PROCESSING AND TRANSMITTING SIGNALS OF A PLURALITY OF CHANNELS

(75) Inventors: Takeshi Toyoyama, Yokohama (JP); Masao Nakano, Yokohama (JP); Shosaku Yamasaki, Yokohama (JP); Shigehisa Sakahara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1210 days.

(21) Appl. No.: 10/098,999

(22) Filed: Mar. 14, 2002

(65) Prior Publication Data

US 2003/0126285 A1 Jul. 3, 2003

(30) Foreign Application Priority Data

Dec. 27, 2001 (JP) .............................. 2001-397781

(51) Int. Cl.
*H04J 3/00* (2006.01)
(52) U.S. Cl. ...................................... 370/476; 370/907
(58) Field of Classification Search ................. 370/221, 370/222, 223, 224, 907
See application file for complete search history.

(56) References Cited

U.S. PATENT DOCUMENTS

| | | | | |
|---|---|---|---|---|
| 5,257,261 A | * | 10/1993 | Parruck et al. | 370/522 |
| 5,265,096 A | * | 11/1993 | Parruck | 370/216 |
| 5,307,353 A | * | 4/1994 | Yamashita et al. | 714/4 |
| 5,315,594 A | * | 5/1994 | Noser | 370/353 |
| 5,323,390 A | * | 6/1994 | Pawelski | 370/371 |
| 5,351,236 A | * | 9/1994 | Pawelski | 370/358 |
| 5,570,344 A | * | 10/1996 | Fujii | 370/217 |
| 5,600,631 A | * | 2/1997 | Takatori et al. | 370/217 |
| 6,128,284 A | * | 10/2000 | Kawamura et al. | 370/241 |
| 6,144,633 A | * | 11/2000 | Ikeda et al. | 370/217 |
| 6,625,115 B1 | * | 9/2003 | Ikeda et al. | 370/217 |
| 6,674,714 B1 | * | 1/2004 | Mochizuki et al. | 370/217 |
| 6,718,513 B1 | * | 4/2004 | Ryu | 714/799 |
| 6,895,182 B1 | * | 5/2005 | Moriyama et al. | 398/3 |
| 6,973,028 B1 | * | 12/2005 | Huai et al. | 370/222 |
| 7,042,836 B2 | * | 5/2006 | Isonuma et al. | 370/224 |
| 7,161,961 B2 | * | 1/2007 | Barker et al. | 370/476 |
| 7,394,828 B1 | * | 7/2008 | Wu | 370/476 |

\* cited by examiner

*Primary Examiner*—Wing F Chan
*Assistant Examiner*—Marcus R Smith
(74) *Attorney, Agent, or Firm*—Katten Muchin Rosenman LLP

(57) ABSTRACT

A transmission device performing prescribed processing on signals of a plurality of channels and transmitting the signals of the plurality of channels. The device includes a first storage unit for storing, in different memory cells for each channel, first control data in which one or more types of control data elements for each channel are configured as at least one word data; a first data structure conversion unit for selecting control data elements of the same type from the first control data of the plurality of channels stored in the first storage unit, and converting the structure of the first control data such that the control data elements of the same type are configured as one word data; and a data generation unit for processing, in word units, the first control data after conversion by the first data structure conversion unit, and generating second control data necessary for the prescribed processing.

14 Claims, 24 Drawing Sheets

FIG. 5

| | 32 | ... | 24 | ... | 2 | 1 | |
|---|---|---|---|---|---|---|---|
| ADDRESS Z | UN-USED | | E (ch24) | ... | E (ch2) | E (ch1) | EAST-SIDE NUT SETTING DATA |
| | UN-USED | | E (ch24) | ... | E (ch2) | E (ch1) | WEST-SIDE NUT SETTING DATA |
| ADDRESS (Z+1) | UN-USED | | F (ch24) | ... | F (ch2) | F (ch1) | EAST-SIDE SUBMARINE-SWITCH CONTROL DATA |
| | UN-USED | | F (ch24) | ... | F (ch2) | F (ch1) | WEST-SIDE SUBMARINE-SWITCH CONTROL DATA |
| ... | | | | ... | | | |

```
void func_RingBR()
{
  int tmp;

if(BSC==0x2 && BR==1){
      tmp = 0xffffff;
  }else{
      tmp = 0;
  }
  if(TESTcont ==0){
      tmp = tmp | SubmarineBR;
      RingBR = tmp & (~NUT);
  }else{
      RingBR = RingBRcont;
  }
}
```

```
int tmp;
if(spanswcont==1){
    tmp = 0xffffff;
}else{
    tmp = 0;
SpanSW = tmp & (~NUT);
```

```
int tmp;
if(spanbrcont==1){
    tmp = 0xffffff;
}else{
    tmp = 0;
SpanBR = tmp & (~NUT);
```

FIG. 14

| | 32 | ... | 24 | ... | 2 | 1 | |
|---|---|---|---|---|---|---|---|
| ADDRESS Y | UN-USED | ... | H (ch24) | ... | H (ch2) | H (ch1) | EAST-SIDE RING-SWITCH CONTROL DATA |
| | UN-USED | ... | H (ch24) | ... | H (ch2) | H (ch1) | WEST-SIDE RING-SWITCH CONTROL DATA |
| | UN-USED | ... | I (ch24) | ... | I (ch2) | I (ch1) | EAST-SIDE RING-BRIDGE CONTROL DATA |
| | UN-USED | ... | I (ch24) | ... | I (ch2) | I (ch1) | WEST-SIDE RING-BRIDGE CONTROL DATA |
| ADDRESS (Y+1) | UN-USED | ... | J (ch24) | ... | J (ch2) | J (ch1) | EAST-SIDE SPAN-SWITCH CONTROL DATA |
| | UN-USED | ... | J (ch24) | ... | J (ch2) | J (ch1) | WEST-SIDE SPAN-SWITCH CONTROL DATA |
| | UN-USED | ... | K (ch24) | ... | K (ch2) | K (ch1) | EAST-SIDE SPAN-BRIDGE CONTROL DATA |
| | UN-USED | ... | K (ch24) | ... | K (ch2) | K (ch1) | WEST-SIDE SPAN-BRIDGE CONTROL DATA |

FIG. 25

| ADDRESS | | | | |
|---|---|---|---|---|
| Y | UNUSED | H | ch1 | ⎫ |
| (Y+1) | UNUSED | H | ch2 | ⎬ RING-SWITCH CONTROL DATA (WEST→EAST) |
| (Y+2) | ⋮ | | ⋮ | ⎭ |
| ⋮ | UNUSED | H | ch24 | |
| | ⋮ | | ch1 ⋮ ch24 | ⎬ RING-SWITCH CONTROL DATA (EAST→WEST) |
| | UNUSED | I | ch1 | ⎫ |
| | UNUSED | I | ch2 | ⎬ RING-BRIDGE CONTROL DATA (WEST→EAST) |
| | ⋮ | | ⋮ | |
| | UNUSED | I | ch24 | ⎭ |
| | ⋮ | | ch1 ⋮ ch24 | ⎬ RING-BRIDGE CONTROL DATA (EAST→WEST) |
| | UNUSED | J | ch1 | ⎫ |
| | UNUSED | J | ch2 | ⎬ SPAN-SWITCH CONTROL DATA (WEST→EAST) |
| | ⋮ | | ⋮ | |
| | UNUSED | J | ch24 | ⎭ |
| | ⋮ | | ch1 ⋮ ch24 | ⎬ SPAN-SWITCH CONTROL DATA (EAST→WEST) |
| | UNUSED | K | ch1 | ⎫ |
| | UNUSED | K | ch2 | ⎬ SPAN-BRIDGE CONTROL DATA (WEST→EAST) |
| | ⋮ | | ⋮ | |
| | UNUSED | K | ch24 | ⎭ |
| | ⋮ | | ch1 ⋮ ch24 | ⎬ SPAN-BRIDGE CONTROL DATA (EAST→WEST) |

TRANSMISSION DEVICE FOR PROCESSING AND TRANSMITTING SIGNALS OF A PLURALITY OF CHANNELS

BACKGROUND OF THE INVENTION

1. Field of the Invention

The present invention relates to a transmission device which performs prescribed processing of signals in a plurality of channels, and transmits signals in the plurality of channels, and a data processing method and data conversion method in this transmission device. The present invention further relates to a program product to cause a computer to execute data processing and data conversion in a transmission device which performs prescribed processing of signals in a plurality of channels, and transmits signals in the plurality of channels.

2. Description of the Related Art

In a communication system, devices in which realtime processing is required conventionally are generally realized through dedicated hardware circuits in order to perform high-speed processing. For example, line switching control units in bi-directional line switched ring (BLSR) systems using the SONET/SDH (Synchronous Optical Network/Synchronous Digital Hierarchy) transmission method are required to perform realtime processing, and so conventionally have been realized using dedicated hardware circuits.

FIG. 21A is a block diagram showing the configuration of a BLSR system using the SONET/SDH transmission method. This BLSR system has, for example, six nodes, n1 to n6, in a 4BLSR system in which four optical fibers (cores) are connected between each node. Of the four fibers, two are used as work lines (Work), and the remaining two are used as protection lines (PTCT). One of the work lines and one of the protection lines are used to transmit optical signals in the clockwise direction; the remaining lines are used to transmit optical signals in the counterclockwise direction.

A plurality of channels are multiplexed using time slots (time-division multiplexing) and transmitted in one optical fiber. For example, in the case of OC (Optical Carrier)-48, channels ch1 to ch48 are multiplexed; in the case of OC-192, channels ch1 to ch192 are multiplexed.

In the state in which there are no faults in any optical fibers or nodes (the normal state), signals (the main signal) are transmitted in the work line. However, when a fault occurs in an optical fiber or in a node, switching processing is executed by an APS (Automatic Protection Switching) protocol, and the main signal is transmitted in the protection line. Specifically, according to the circumstances of the fault, a span-switch and span-bridge, or a ring-switch and ring-bridge, are executed at the node.

FIG. 21B shows switching processing for the case in which a fault has occurred in the four optical fibers between nodes n2 and n3 in the BLSR system of FIG. 21A. When a fault occurs between nodes n2 and n3, a loop-back (a ring-switch and ring-bridge in each of the east side in node n2 and the west side in node n3) is executed by the APS protocol, in an attempt to salvage the main signal.

Though not shown in the figure, if a fault occurs only in the work line between nodes n2 and n3, instead of a loop-back, a span-switch and span-bridge are executed in which the main signal of the work line between nodes n2 and n3 is switched to the protection line in the same direction between nodes n2 and n3, in an attempt to salvage the main signal. For example, if a fault occurs in the work line from node n2 to node n3, a span-bridge is executed on the east side of node n2, and the main signal is transmitted via the protection line to node n3. And, a span-switch is executed on the west side of node n3, to return the main signal input from the protection line to the work line side.

Such switching processing in the nodes by the APS protocol is executed by a line switching control unit provided at each node. FIG. 22 is a block diagram showing in summary the configuration of nodes n1 to n6 in a BLSR system.

Each node has a host processor 1; a line switching control unit 200; a span-switch unit 3; a ring-switch unit 4; a span-bridge unit 5; and a ring-bridge unit 6. The span-switch unit 3 has selection circuits 31 and 32, and AIS (Alarm Indicated Signal) insertion circuits 33 and 34. The ring-switch unit 4 has selection circuits 41 and 42; the span-bridge unit 5 has selection circuits 51 and 52; and the ring-bridge unit 6 has selection circuits 61 and 62.

Though not shown in the figure, within each node the main signal is processed as an electrical signal, so that at the input terminal, a photoelectric converter to convert optical signals input from the optical fiber into electrical signals is provided, and at the output terminal, a photoelectric converter to convert electrical signals into optical signals is provided. A switch unit to perform time slot switching (exchanging) is also provided.

The host processor 1 manages node operation; holds information relating to faults according to the APS protocol which is communicated between nodes, information on the initial settings of the device, and other information; and sends this information as control data to the line switching control unit 200.

The line switching control unit 200 is configured from dedicated hardware circuitry. The line switching control unit 200 generates control signals to control each of the selection circuits and/or AIS insertion circuits of the span-switch unit 3 to the ring-bridge unit 6, based on control data sent by the host processor 1, and sends the control signals to these circuits.

Based on these control signals, the selection circuits 31, 32, 41, 42, 51, 52, 61, and 62 select and output one main signal from the two main signals input. The AIS insertion circuits 33 and 34 output an AIS based on control signals, and insert the AIS into the main signal. By this means, normal transmission/reception of main signals, as well as switching processing (ring-switch and ring-bridge, or span-switch and span-bridge processing) upon occurrence of a fault, are executed.

For example, at the span switch and span bridge, the work line channels are switched with the protection line channels in the same direction, and an AIS is inserted into the protection line channels. At the ring switch and ring bridge, the work line channels are switched with the protection line channels in the opposite direction.

However, when hardware circuitry is used to realize a line switching unit, it is necessary to redesign and remanufacture hardware each time there is a change in the recommended specifications of the ITU-T or similar, or a small-scale modification, addition, or functional upgrade of specifications. Consequently development time is lengthened, and costs are increased.

On the other hand, rapid product development and shipment is also required. Hence there is a need to realize in software, rather than in hardware circuitry, the functions of a line switching control unit, which is required to perform realtime processing, and to develop an inexpensive device in a short period of time.

FIG. 23 is a block diagram showing the conventional configuration of the line switching control unit 200 for the case in which processing by the line switching control unit 200 is realized in software. The line switching control unit 200 has a CPU (RISC processor) 201; memory (two-port RAM) 202 and 205; work memory (RAM) 203; instruction storage memory (ROM) 204; and parallel/serial converters (PS) $206_1$ to $206_4$.

The memory 202 stores control data sent from the host processor 1. FIG. 24 shows control data stored in memory 202.

The control data sent from the host processor 1 is stored in memory cells in order from a prescribed address (here, address X). Each memory cell holds 32 bits. In the figure, the right end of each memory cell is the first (lowermost) bit, and the left end is the 32nd (uppermost) bit.

Control data has line control data (A, B, C, D, X, Y), provided in a plurality of channel units (or ring units) (in FIG. 24, there are 24 channel units), and line setting data (channel setting data), provided for each channel.

Line control data includes two bits of node fault data A (hereafter also called "BSC"); one bit of ring bridge trigger data B (hereafter also "BR"); one bit of ring switch trigger data C (hereafter also "SW"); one bit of control data D for device testing (hereafter also "TESTcont"); one bit of span switch trigger data X (hereafter also "Spanswcont"); and one bit of span bridge trigger data Y (hereafter also "Spanbrcont").

In FIG. 24, the line control data is provided in 24channel units. Specifically, one set of line control data is provided for channels ch1 to ch24, directed from the west (input) side of the node toward the east (output) side (hereafter "east side"), and one set of line control data is provided for channels ch1 to ch24, directed from the east (input) side of the node toward the west (output) side (hereafter "west side").

When there are twenty-five or more channels, a set of line control data is similarly provided for the 24 east-side channels ch25 to ch48, and a set of line control data is provided for the 24 west-side channels ch25 to ch48.

The node fault data A (BSC) indicates that no fault has occurred when A=0, indicates occurrence of a fault at another node when A=1, indicates that a fault has occurred in the east-side channel of the node itself when A=2, and indicates that a fault has occurred in the west-side channel of the node itself when A=3.

The ring-bridge trigger data B (BR) indicates that no ring bridge is to be executed when B=0, and that a ring bridge is to be executed when B=1. The ring-switch trigger data C (SW) indicates that no ring switch is to be executed when C=0, and that a ring switch is to be executed when C=1. The device testing control data D (TESTcont) indicates that device testing is not performed when D=0, and that device testing is performed when D=1.

The span-switch trigger data X (Spanswcont) indicates that no span switch is to be executed when X=0, and that a span switch is to be executed when X=1. The span-bridge trigger data Y (Spanbrcont) indicates that no span bridge is to be executed when Y=0, and that a span bridge is to be executed when Y=1.

Line setting data includes, as control data elements, one-bit NUT channel (channel which does not perform salvaging by means of the BLSR) setting data E (hereafter also called simply "NUT"); one-bit submarine switch control data F (hereafter also "SubmarineSW"); one-bit ring-switch control data G for device testing (hereafter also "RingSWcont"); one-bit submarine bridge control data S (hereafter also "SubmarineBR"); and one-bit ring-bridge control data T for device testing (hereafter also "RingBRcont"). These line setting data bits are provided for each channel.

When the data bit E (NUT) is set to E=0, the corresponding channel is set to a channel which is salvaged by means of BLSR, and when set to E=1, the corresponding channel is set to a channel which is not salvaged by means of BLSR. When the data bit F (SubmarineSW) is set to F=0, submarine switching is not performed; when set to F=1, submarine switching is performed.

When the data bit G (RingSWcont) is set to G=0, ring switching for device testing is not performed; when set to G=1, ring switching for device testing is performed. When the data bit S (SubmarineBR) is set to S=0, submarine bridging is not performed; when set to S=1, submarine bridging is performed. When the data bit T (RingBRcont) is set to T=0, ring bridging for device testing is not performed; when set to T=1, ring bridging for device testing is performed.

This line control data and line setting data is converted into control signal data and stored in the memory 205.

As shown in FIG. 25, the control signal data includes, as data elements, ring-switch control data H (hereafter also "RingSW"); ring-bridge control data I (hereafter also "RingBR"); span-switch control data J (hereafter also "SpanSW"); and span-bridge control data K (hereafter also "SpanBR"). This control signal data is provided for the east side of each channel, and for the west side of each channel.

The east-side ring-switch control data H is sent to the selection circuit 41 of the ring-switch unit 4; the west-side ring-switch control data H is sent to the selection circuit 42 of the ring-switch unit 4. The selection circuits 41 and 42 select and output the main signal on the first input (work line) side when H=0, and select and output the main signal on the second input (protection line) side when H=1.

The east-side ring-bridge control data I is sent to the selection circuit 61 of the ring-bridge unit 6; the west-side ring-bridge control data I is sent to the selection circuit 62 of the ring-bridge unit 6. The selection circuits 61 and 62 select and output the main signal on the first input (work line) side when I=0, and select and output the main signal on the second input (protection line) side when I=1.

The east-side span-switch control data J is sent to the selection circuit 31 and AIS insertion circuit 33 of the span-switch unit 3; the west-side span-switch control data J is sent to the selection circuit 32 and AIS insertion circuit 34 of the span-switch unit 3. The selection circuits 31 and 32 select and output the main signal on the first input (work line) side when J=0, and select and output the main signal on the second input (protection line) side when J=1. The AIS insertion circuits 33 and 34 insert and output an AIS when J=1, and do not insert and output an AIS when J=0.

The east-side span-bridge control data K is applied to the selection circuit 51 of the span-bridge unit 5. The west-side span-bridge control data K is applied to the selection circuit 52 of the span-bridge unit 5. The selection circuits 51 and 52 select and output the main signal on the first input (work line) side when K=0, and select and output the main signal on the second input (protection line) side when K=1.

If processing to convert line control data and line setting data into control signal data H through K, which is conventionally executed in hardware, is replaced without modification by software processing, the software processing is described by the flowchart as shown in FIG. 26. This flowchart shows only the portion in which the east-side ring-switch control data H is generated. FIG. 27 is an example of a program, written in the C programming language and in the assembly language for a RISC processor, to perform the processing of this flowchart. This program is stored in the instruction storage memory 204.

The CPU 201 first initializes the variable i, used as an index to specify the channel number, to 1 (S101), and then judges whether the NUT of channel chi is 0 or not (S102).

If the NUT of channel chi is not 0 ("N" in S102), the CPU 201 sets RingSW (data H) for channel chi to 0 (S109), and if the NUT of channel chi is 0 ("Y" in S102), judges whether TESTcont is 0 or not (S103).

If TESTcont is not 0 ("N" in S104), the CPU 201 sets RingSW to the value of RingSWcont (Silo), and if TESTcont is 0 ("Y" in S104), judges whether SubmarineSW for channel chi is 0 or not (S104).

If SubmarineSW is not 0 ("N" in S104), the CPU 201 sets RingSW to 1 (S111), and if SubmarineSW is 0 ("Y" in S104), judges whether BSC is 2 ("10" in binary notation) and SW is 1 (S105).

If BSC is 2 and SW is 1 ("Y" in S105), the CPU 201 sets RingSW to 1 (S106), and otherwise ("N" in S105) sets RingSW to 0 (S112).

Thereafter, the CPU 201 increments the variable i by 1, and generates the data H for the next channel (S107, S108). This processing is repeated a number of times N equal to the number of channels (for example, N=24).

In this way, if conventional hardware processing is realized in software without modification, processing in channel units is repeated for the number of channels accommodated, so that processing time is lengthened, and there is the problem that processing cannot be performed within the allowed time.

For example, as shown in FIG. 27, when using instructions for a RISC processor, twenty-two steps per channel are required. Generation of a ring-bridge control signal I involves similar processing, and so the number of steps is approximately the same. Hence when executing a ring switch and ring bridge, the number of steps is approximately 44.

In an OC-192 4BLSR system, processing for 768 channels must be performed, and so a total of 768×44=33792 steps are required.

If the operating frequency of the CPU 201 is 100 MHz, and one clock cycle is required for execution of one step, then 33792×10 (nanoseconds)=338 (microseconds) is required.

This is only one example of the time required for generation of ring-switch control data H and ring-bridge control data I; in actual processing, RIP (Ring Interworking on Protection) and other functions are realized, so that processing is more complicated, and still more steps are required.

Consequently when realizing the functions of a line switching control unit 200 in software, there is the concern that the allowable time from the occurrence of a fault until the completion of switching (for example, 50 milliseconds) may be exceeded.

In order to speed software processing, the CPU operating frequency may be raised, the CPU bandwidth (number of processed bits) may be increased, or a multiprocessor architecture may be adopted; however, these measures result in increased power consumption, and are not preferable in that they result in increases in hardware scale and costs.

Hence there is a need to reduce the number of steps required for processing to generate the control signal data H, I and similar, to shorten the time required for processing.

SUMMARY OF THE INVENTION

The present invention was devised in consideration of this, and has as an object reduction of the number of processes of data processing in the nodes and other transmission devices in a BLSR system.

A transmission device according to the present invention is a transmission device for performing prescribed processing on signals of a plurality of channels and transmitting the signals of the plurality of channels, comprising: a first storage unit for storing first control data for the plurality of channels in different memory cells for each channel, each first control data for each channel having one or more types of first control data elements for each channel configured as at least one word data; a first data structure conversion unit for selecting first control data elements of the same type from said first control data stored in said first storage unit, and converting the structure of said first control data such that the first control data elements of the same type are configured as one word data; and a data generation unit for processing, in word units, said first control data converted by said first data structure conversion unit, and generating second control data necessary for said prescribed processing.

A data processing method according to the present invention is a data processing method in a transmission device for performing prescribed processing of signals for a plurality of channels and transmitting signals over the plurality of channels, comprising steps of: storing first control data for the plurality of channels in different memory cells for each channel, each first control data for each channel having one or more types of control data elements for each channel configured as at least one word data; selecting control data elements of the same type from said first control data stored in said memory cells; converting the structure of said first control data such that the control data elements of the same type are configured as one word data; processing the first control data after said conversion in word units; and generating second control data necessary for said prescribed processing.

A data conversion method according to the present invention is a data conversion method in a transmission device for performing prescribed processing of signals for a plurality of channels and transmitting the signals over the plurality of channels, comprising steps of: storing first control data for the plurality of channels in different memory cells for each channel, each first control data for each channel having one or more types of control data elements for each channel configured as at least one word data; selecting control data elements of the same type from said first control data stored in said storage cells; and converting the structure of said first control data such that the control data elements of the same type are configured in one word data.

The program product according to the present invention causes the above data processing method or data conversion method to be executed by a computer.

According to the present invention, from the first control data for the plurality of channels, the first control data elements of the same type are selected, and the selected first control data elements of the same type are converted to one word data. As a result, the one word data has the first control data elements of the same type for a plurality of channels. Hence even when the processing of the data generation unit is described by a program (software) which is executed by a central processing unit (CPU), the CPU can process the control data elements of the same type for a plurality of channels by one word data processing.

By this means, the number of processes can be reduced, and the time required for processing can be shortened. Also, functions can be realized in software, so that a system which can flexibly accommodate specification changes can be developed at low cost and in a short period of time, while retaining processing performance.

BRIEF DESCRIPTION OF THE DRAWINGS

FIG. 5 shows an example of the line setting data after data structure conversion processing;

FIG. 14 shows control signal stored in memory 22;

FIG. 25 shows control signal data;

DESCRIPTION OF THE PREFERRED EMBODIMENTS

First Embodiment

Figure 1:
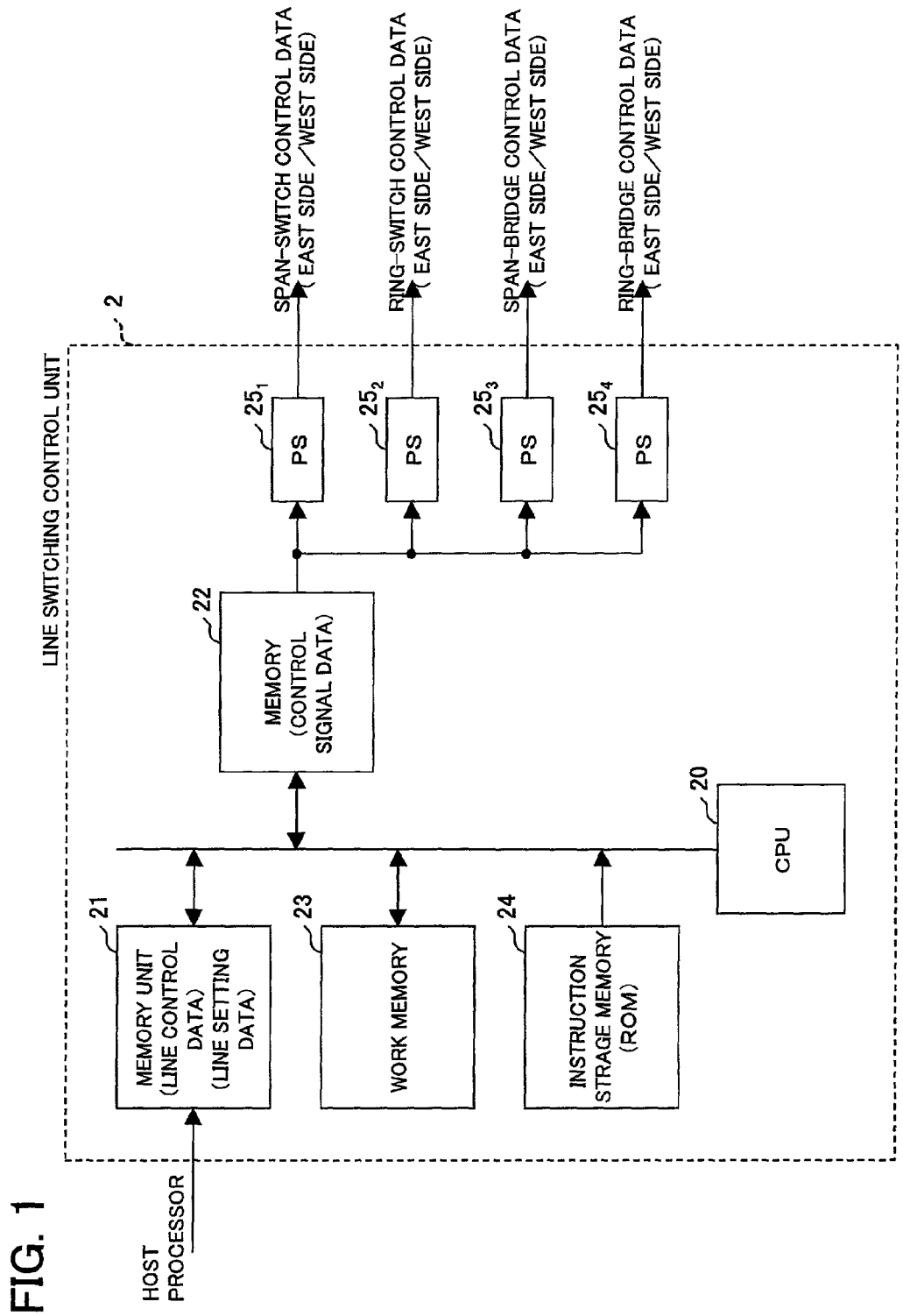
FIG. 1 is a block diagram showing the configuration of a line switching control unit according to a first embodiment of the present invention.
Figure 21A:
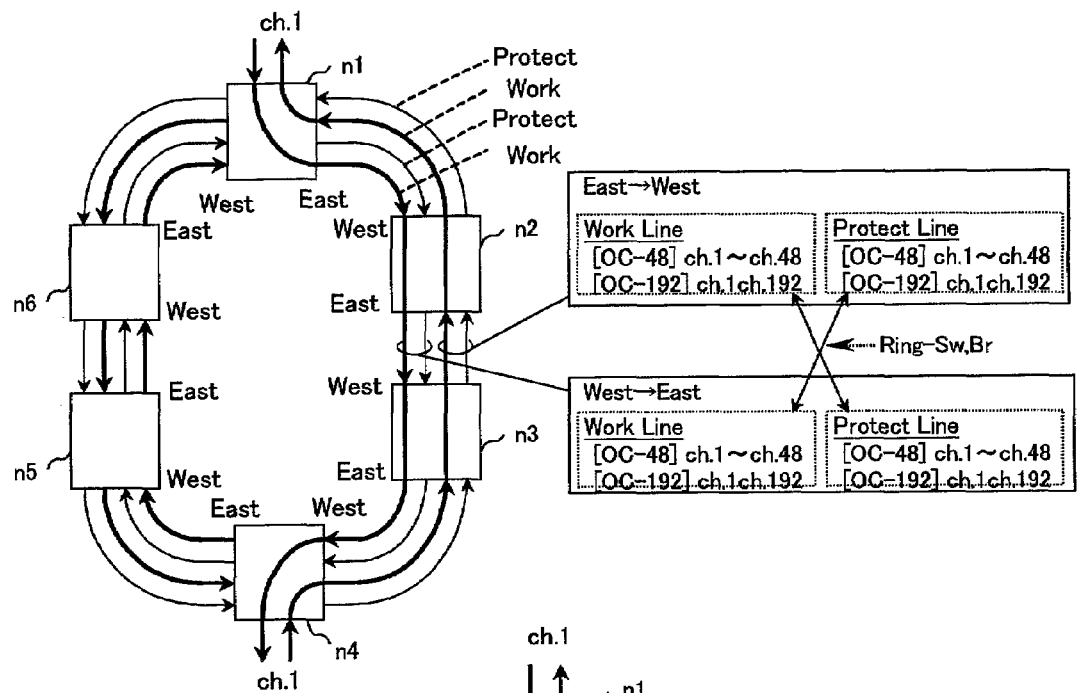
FIG. 21A is a block diagram showing the configuration of a BLSR system using the SONET/SDH transmission method.
Figure 21B:
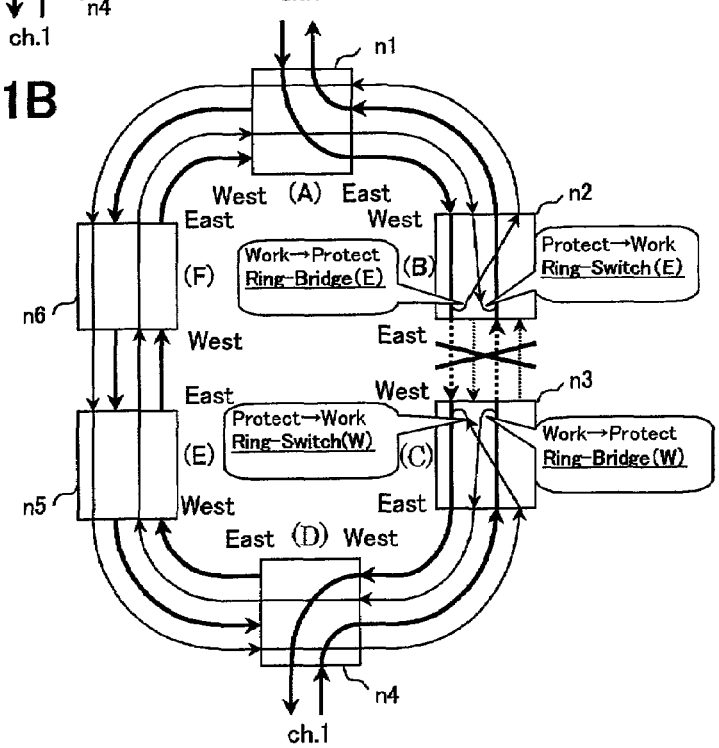
FIG. 21B shows switching processing for the case in which a fault has occurred in the four optical fibers between nodes n2 and n3 in the BLSR system of FIG. 21A.
Figure 22:
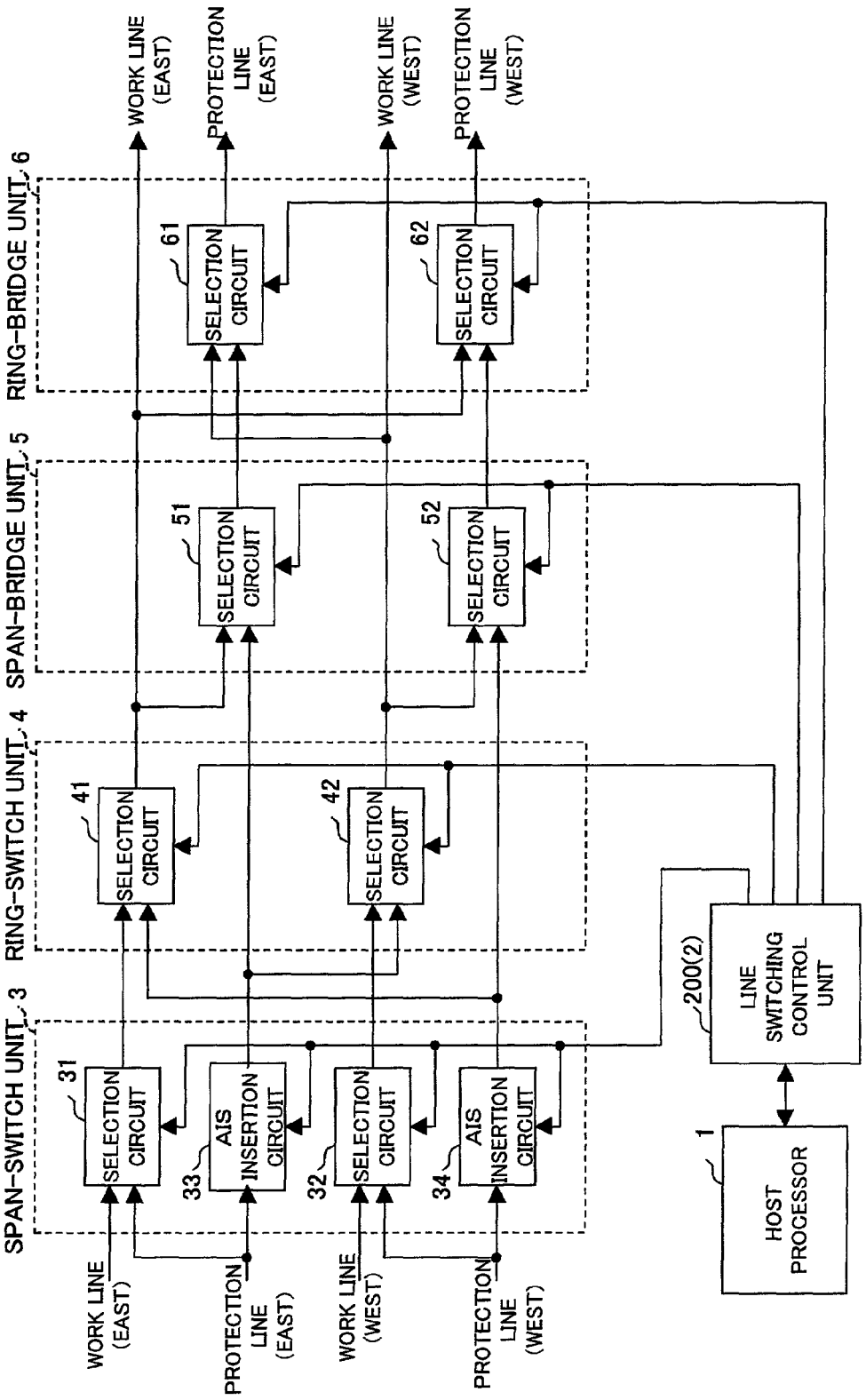
FIG. 22 is a block diagram showing in summary the configuration of nodes n1 to n6 in a BLSR system.

FIG. 1 is a block diagram showing the configuration of a line switching control unit 2 according to a first embodiment of the present invention. As explained above, each node of a BLSR system has the line switching control unit 2. The overall configuration of the BLSR system, and the general configuration of each node, are shown in the above-mentioned FIG. 21 and FIG. 22 respectively, and so explanations are omitted. The line switching control unit 200 in FIG. 22 is replaced by the line switching control unit 2.

This line switching control unit 2 has a CPU 20; a memory unit 21; a memory 22; a work memory 23; an instruction storage memory 24; and parallel/serial converters (PS) $25_1$ to $25_4$.

The CPU 20 is, for example, a RISC processor. In this embodiment, one word (the unit of information that can be processed (read, written, or operated on) at once) of the CPU 20 is 32 bits.

The instruction storage memory 24 is, for example, ROM, and stores a program describing the processing of the line switching control unit 2 (including data structure conversion processing and control signal data generation processing, described below). The CPU 20 executes this program.

The work memory 23 is RAM having, for example, 32 bits in the memory cells (one word) at each address. The work memory 23 stores intermediate data generated during processing of the CPU 20. The intermediate data includes line control data sent from the host processor 1, and the results of data structure conversion of line setting data (see FIG. 5, described below).

The memory 22 is, for example, two-port RAM having 32 bits in the memory cells (1 word) at each address. CPU 20 writes control signal data (see FIG. 14, described below) to this memory 22 through one of the ports, and the control signal data is read from the other port, and sent to PS $25_1$ to $25_4$.

PS $25_1$ to $25_4$ (hereafter sometimes collectively called "PSs 25") convert parallel data (for example, 32-bit data) sent from the memory 22 into serial data (bit streams), and output the serial data.

PS $25_1$ outputs to the span-switch unit 3 (see FIG. 22) east-side and west-side span-switch control data J. PS $25_2$ outputs to the ring-switch unit 4 (see FIG. 22) east-side and west-side ring-switch control data H. PS $25_3$ outputs to the span-bridge unit 5 (see FIG. 22) east-side and west-side span-bridge control data K. PS $25_4$ outputs to the ring-bridge unit 6 (see FIG. 22) east-side and west-side ring-bridge control data I. The east-side and west-side data for each of the data items H through K is output by time division; first the east-side data is output, and then the west-side data is output.

Figure 2:
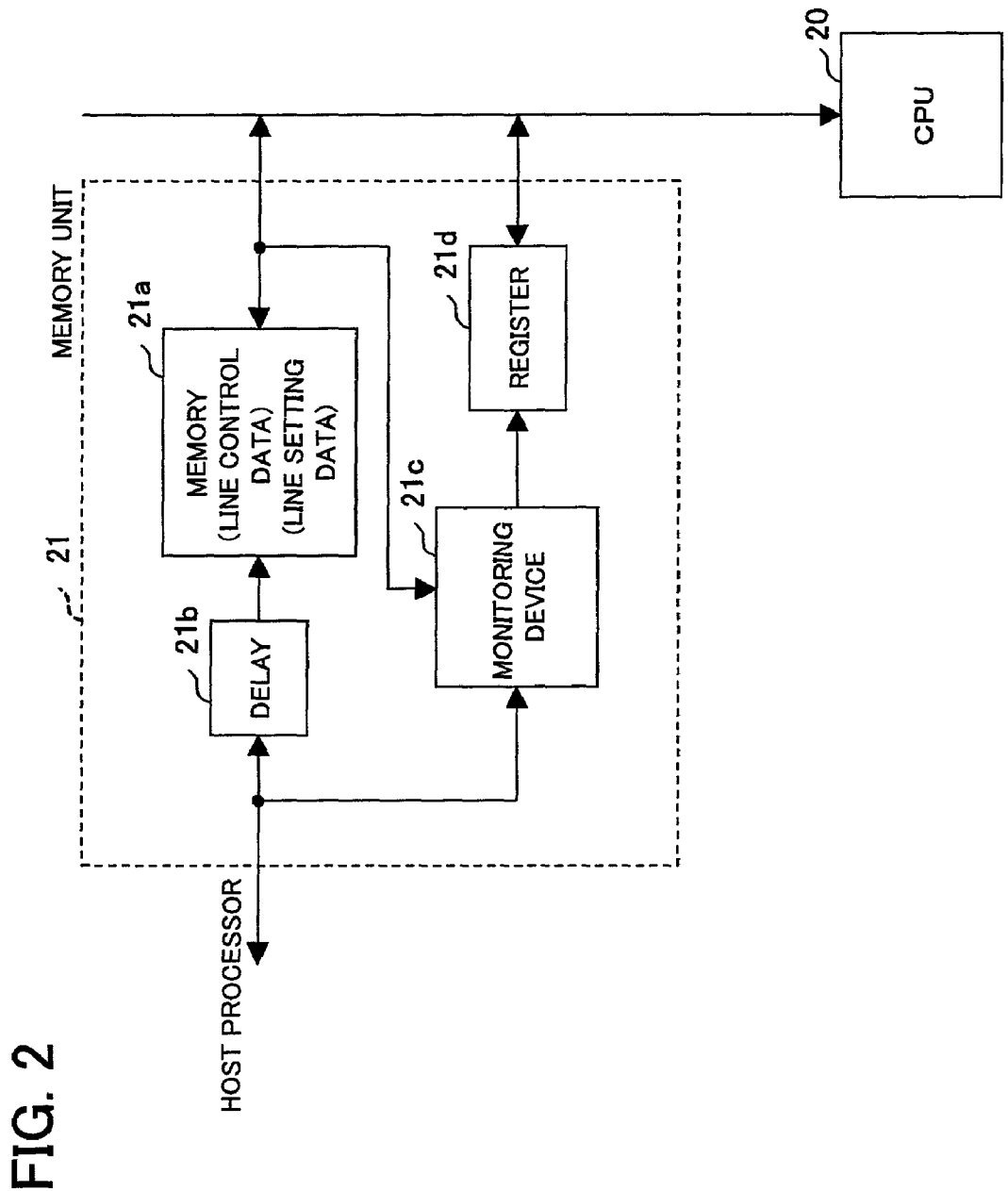
FIG. 2 is a block diagram showing the detailed configuration of the memory unit 21.

The memory unit 21 has the configuration shown in FIG. 2, having a memory 21a, a delay element (delay) 21b, a monitoring device 21c, and a register 21d.

The memory 21a is, for example, two-port RAM having 32 bits in the memory cells (1 word) at each address, and stores line control data and line setting data provided by the host processor 1. This line control data and line setting data stored in the memory 21a is the same as that shown in the above-mentioned FIG. 24, and so an explanation is here omitted. The address (in FIG. 24, address X and subsequent addresses) and bit positions at which the line control data and line setting data are stored are determined in advance.

This line control data and line setting data is provided, together with the address in memory 21a (and a write-enable signal), to the delay element 21b and monitoring device 21c by the host processor 1. The line control data and line setting data may be provided all at once (for example, when making initial settings (provisioning)), or only that data for channels which have changed may be provided (for example, when a fault occurs during operation).

The delay element 21b outputs to the memory 21a the control data (line control data, line setting data) and address (and write-enable signal) after a prescribed time has passed. This prescribed time is the time until the end of reading of data from the memory 21a by the monitoring device 21c, as described below; this may for example be the time of several clock cycles of the clock signal supplied to the CPU 20.

The memory 21a stores, in the memory cell specified by the address sent from the delay element 21b, the control data (line control data or line setting data) provided by the delay element 21b. As a result, the contents of memory cells of the memory 21a are updated.

When the monitoring device 21c receives data and an address from the host processor 1, it reads the data stored in the memory cell specified by the received address from the memory 21a. As explained above, this reading is performed before the delay element 21b outputs (writes) to the memory 21a the data received from the host processor 1. Hence data read by the monitoring device 21c from the memory 21a is data prior to updating (replacement) by the memory 21a with data provided by the host processor 1.

The monitoring device 21c compares the control data (line control data or line setting data) read from memory 21a with the control data (line control data or line setting data) received from the host processor 1. If, as a result of the comparison, the data items are different, the monitoring device 21c writes a "1" to the prescribed bit of the register 21d.

The register 21d has for example 32 bits. Each of the bits in the register 21d corresponds to one or more channels. For example, the first bit corresponds to the east-side channels ch1 to ch24 and to the west-side channels ch1 to ch24, for a total of 48 channels. The second bit corresponds to the east-side channels ch25 to ch48 and to the west-side channels ch25 to ch48, for a total of 48 channels. The situation is similar for other bits. In this way, by associating each bit with one or more channels, it is possible to perform processing only for channels associated with bits which have changed.

If, as a result of comparison, there has been a change in the line control data and/or line setting data, the monitoring device 21c writes a "1" to the corresponding bits of the register 21d; if there have been no changes, no writing is performed.

For example, if there is a change in at least one line setting data item for the east-side and/or west-side channels ch1 to ch24, the monitoring device 21c writes a "1" to the first bit of the register 21d. If there is a change in the line control data for the east-side and/or west-side channels ch1 to ch24 (data at address X, address (X+1), address (X+26), address (X+27)), a "1" is written to the first bit of register 21d. Similar processing is performed for the other channels.

The CPU 20 performs polling of the register 21d at prescribed time intervals, and reads the value of the register 21d. It is preferable that this prescribed time interval be adequately short (for example, several milliseconds, or several to several hundred microseconds) compared with the switching allowed time (approximately 50 milliseconds).

When at least one bit of the register 21d is "1", the CPU 20 judges that there has been a change in the line control data and/or line setting data, and begins data structure conversion processing and control signal data generation processing. Thereby, data structure conversion and other processing can be begun in synchronization with the change in line control data and/or line setting data.

Prior to or after this data structure conversion processing and control signal data generation processing, the CPU 20 resets all the bits of the register 21d to "0".

First the CPU 20 executes data structure conversion processing, and then executes control signal data generation processing.

Data structure conversion processing is processing in which the line setting data (see FIG. 24) for each channel, stored in individual memory cells of the memory 21a, is rearranged within a single memory cell (one word) of the work memory 23 as shown in FIG. 5.

FIG. 5 shows the line setting data after data structure conversion processing. FIG. 5 shows an example for the case in which the number of east-side channels and the number of west-side channels are both 24.

Figure 24:
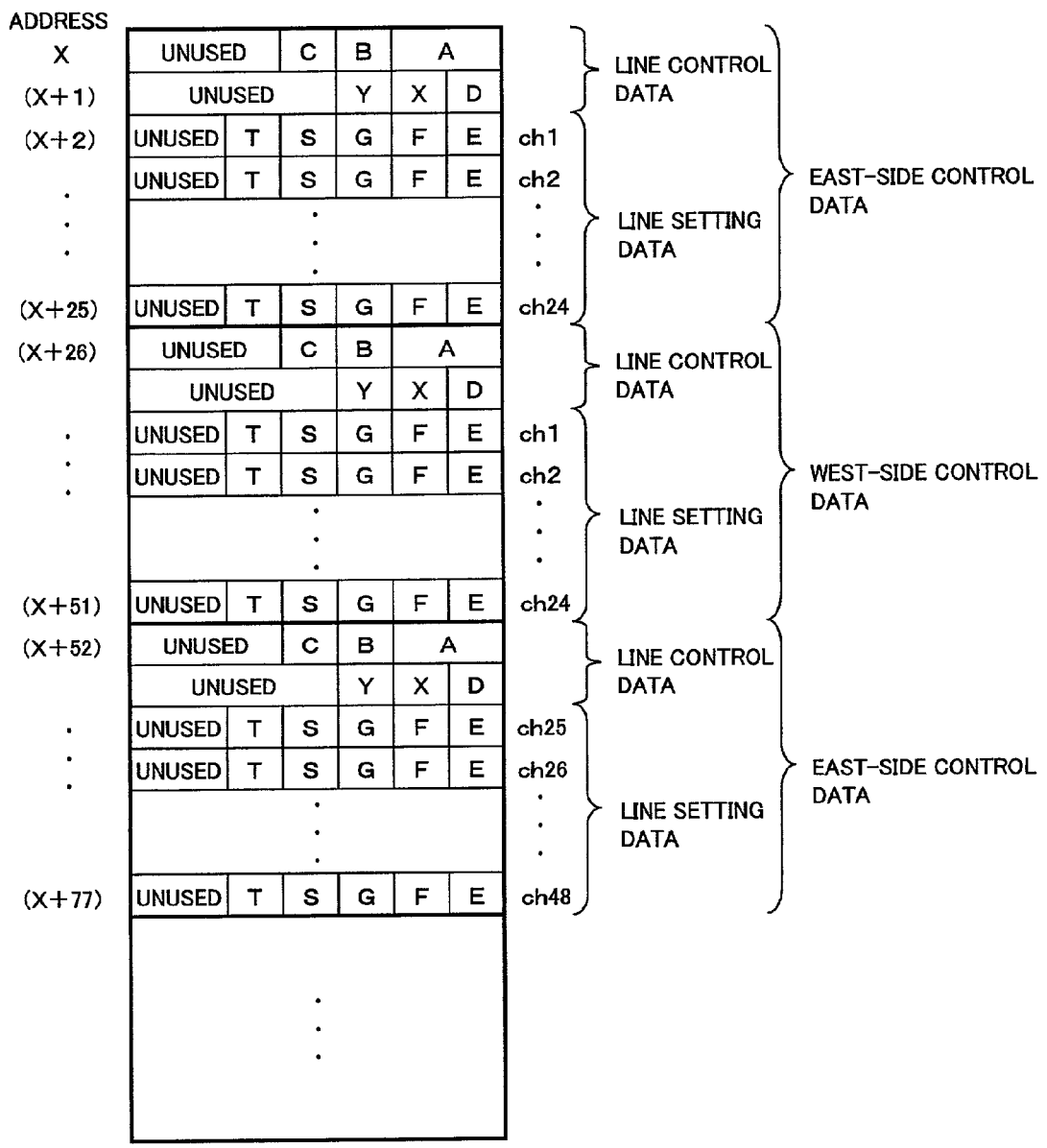
FIG. 24 shows control data sent from the host processor.
Figure 26:
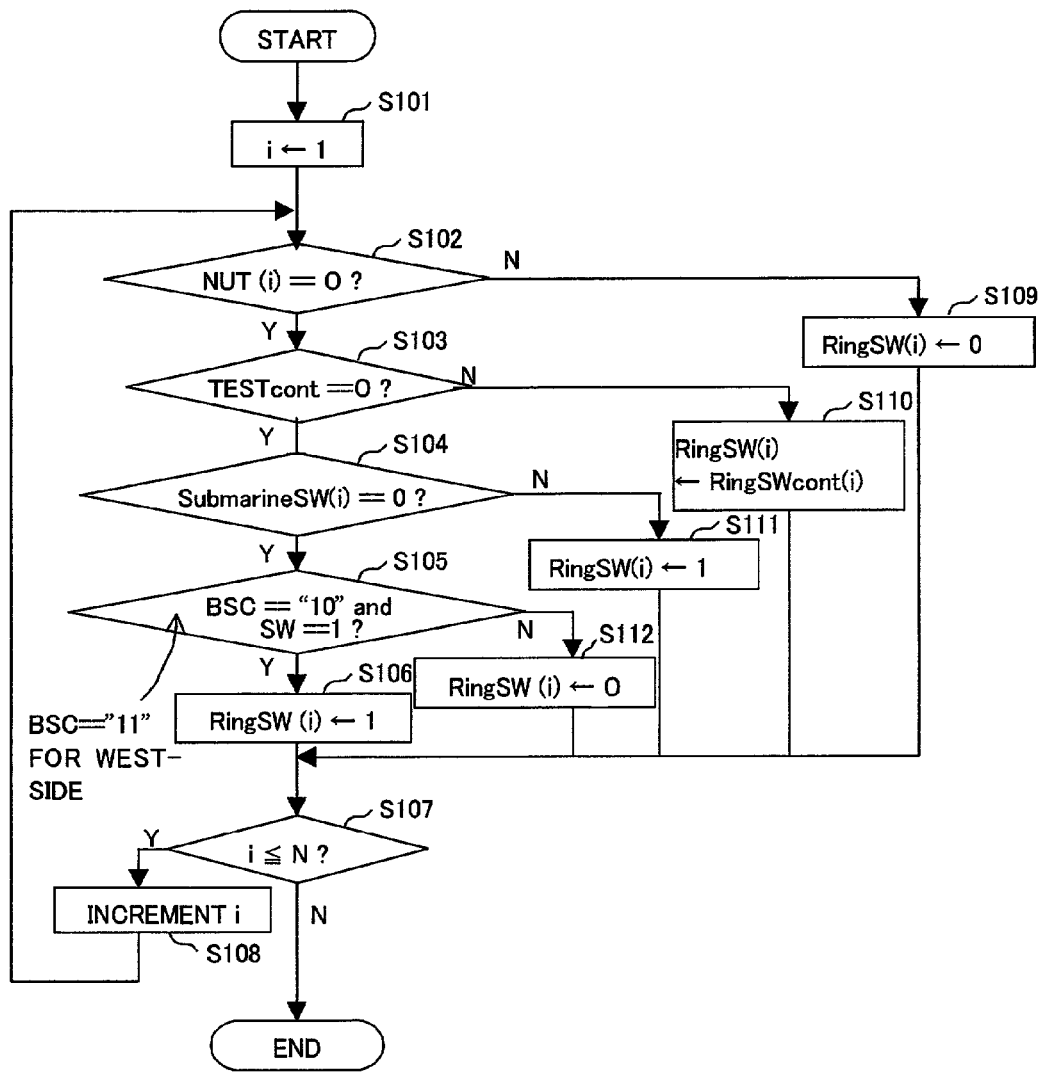
FIG. 26 is a flowchart showing the flow of processing to convert line control data and line setting data into control signal data.
Figure 27:
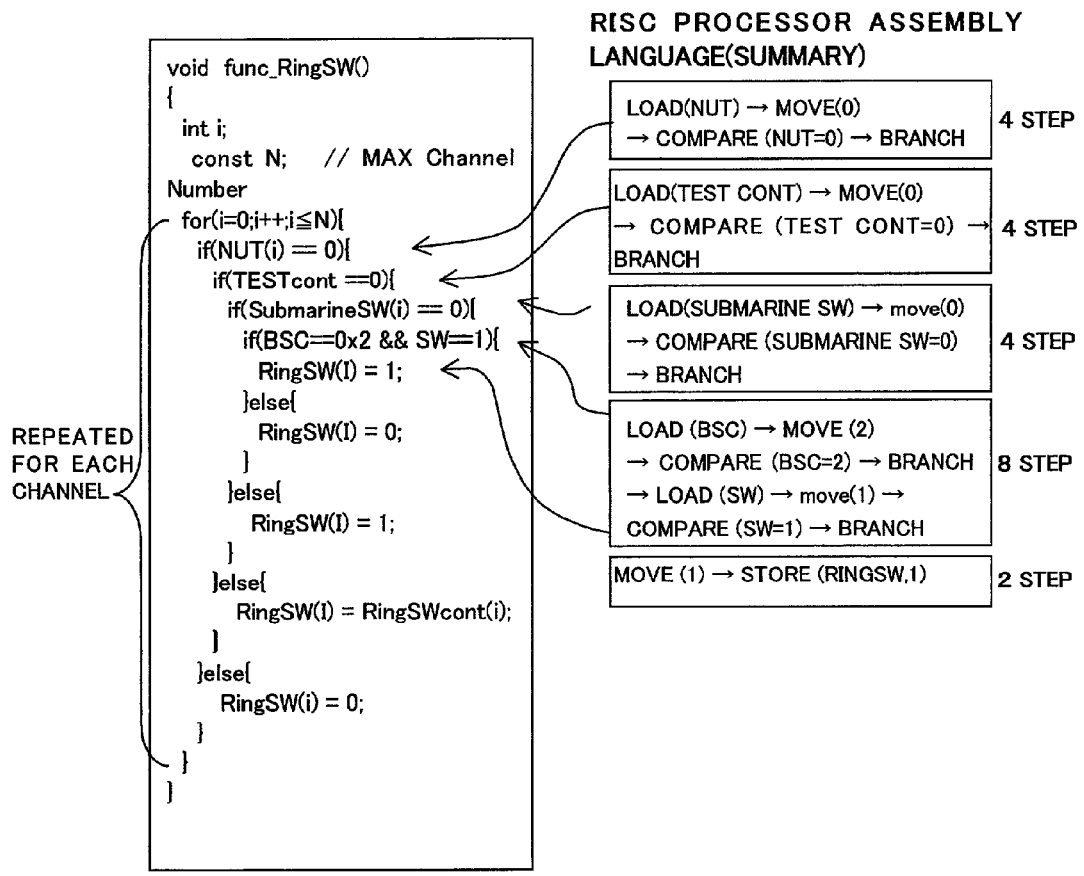
FIG. 27 is an example of a program, written in the C programming language and in the assembly language for a RISC processor, to perform the processing of the flowchart shown in FIG. 26.

The NUT setting data E for each of the east-side channels ch1 to ch24 are stored in order from the first to the 24th bit in a single memory cell. That is, in the memory 21a, as shown in FIG. 24, data E which has been arranged in series from address (X+2) to address (x+25) is arranged in parallel in the work memory 23, as shown in FIG. 5, within the single memory cell of address Z. The NUT setting data E of the west-side 24 channels is similarly processed. Similar conversions are performed for the other line setting data F, G, S and T.

When there exist 25 or more channels on both the east and the west sides, data is arranged in parallel in memory cells for each of 24 channels' worth of line setting data. For example, the data E for the 24 channels from channel ch25 to ch48 is stored at address (Z+1).

Figure 3:
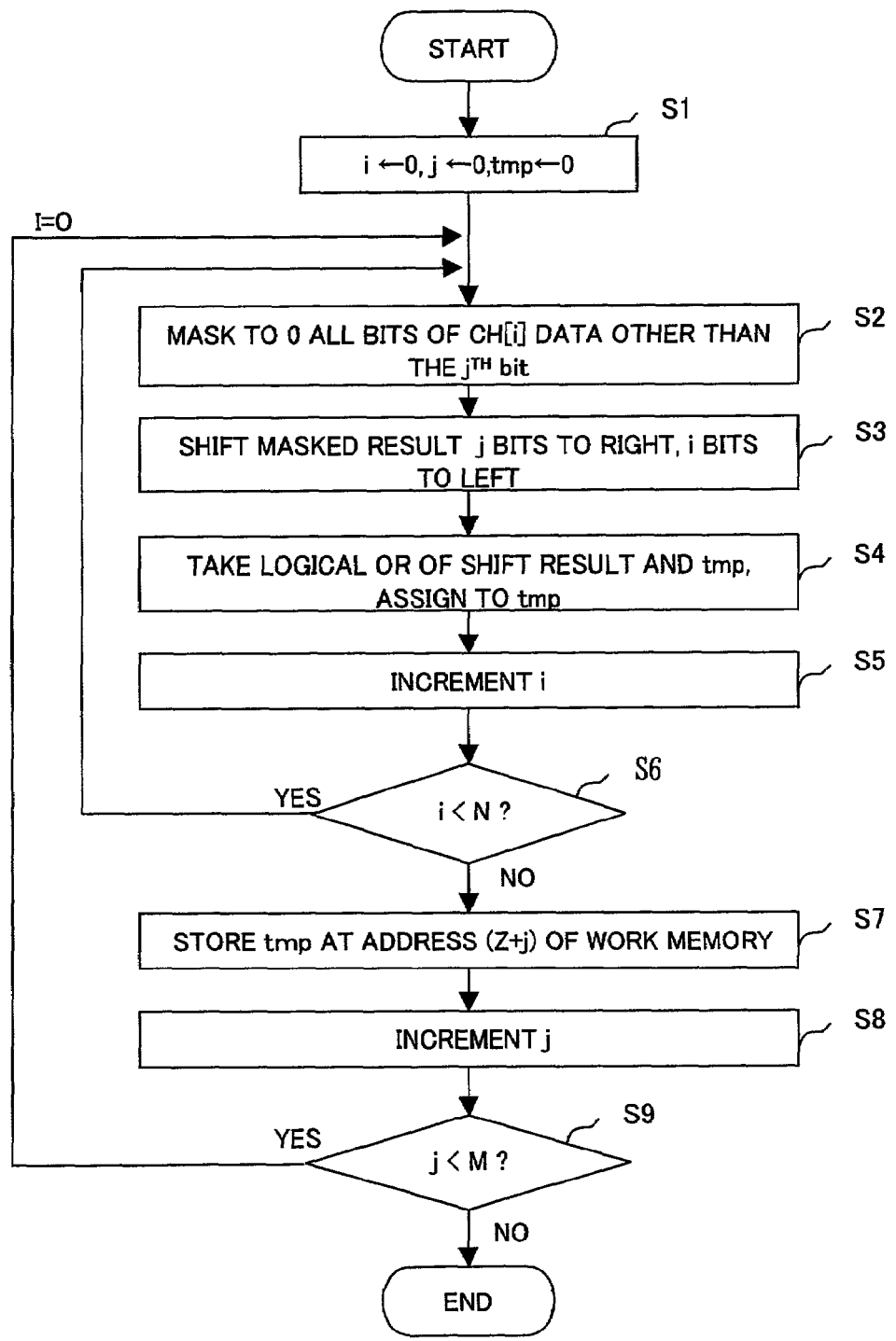
FIG. 3 shows a flowchart describing data structure conversion processing.

FIG. 3 shows a flowchart describing such data structure conversion processing. As one example, this flowchart shows data structure conversion processing for the line setting data E, F, G, S and T of east-side channels ch1 to ch24.

First, the CPU 20 sets the variable i, used as an index to specify the channel number, to 0, and sets the variable j, used as an index to specify the type of line setting data, to 0 (S1). Also, the CPU 20 substitutes 0 as the value of the one-word variable tmp (32 bits) for temporary storage (S1).

Next, the CPU 20 masks to 0 the value of bits other than the $j^{th}$ bit of the line setting data at address (X+2+i) in the memory 21a (that is, line setting data for channel ch(i+1); hereafter "CH[i] data") (S2). By this means, values other than the line setting data to be processed (for example, if j=0, the NUT channel setting data E; if j=1, the submarine switch control data F) are set to 0.

Next, the CPU 20 shifts the masked CH[i] data to the right by j bits, and then shifts the data to the left by i bits (S3). By this means, the parameters of channel ch1 are moved to the first bit (lowermost bit), the parameters of channel ch2 are moved to the second bit, and the parameters of channel chi are moved to the $(i+1)^{th}$ bit.

Then, the CPU 20 takes the logical sum (computes the logical OR) of the shifted value and the variable tmp, and assigns the computation result to the variable tmp (S4). Following this, the CPU 20 increments the variable i by 1 (S5), and compares the variable i and the number of channels N (here, N=24) (S6).

If the variable i is smaller than the number N ("YES" in S6), the processing of steps S2 through S6 is again repeated. By repeating the processing of steps S2 to S5 N times, a single line setting data item for N channels, ch1 through chN, is stored in the single-word variable tmp.

In step S6, if the variable i is equal to or greater than N ("NO" in S6), the CPU 20 writes the value of the variable tmp to the address (Z+j) in the work memory 23 (S7).

Next, the CPU 20 increments the variable j by 1 (S8), and compares the variable j and the number of line setting data items M (here M=5) (S9). If the variable j is smaller than M ("YES" in S9), the CPU 20 returns again to the step S2, and repeats processing from step S2. If the variable j is equal to or greater than M ("NO" in S9), the CPU 20 ends processing. By this means, the data structure of the line setting data shown in FIG. 22 is converted into the data structure shown in FIG. 5.

Similar processing is performed for the line setting data items E, F, G, S and T for the west-side channels ch1 to ch24.

Figure 4:
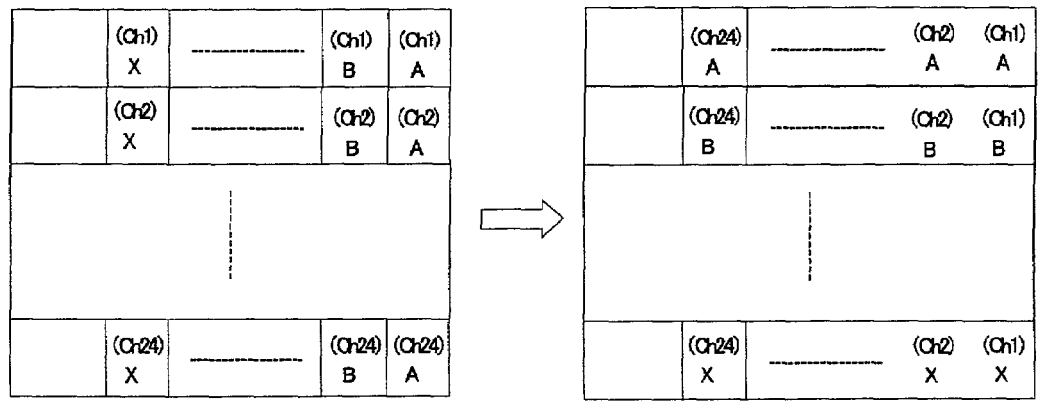
FIG. 4A shows data structures before rearrangement and after rearrangement.
FIG. 4B shows an example of a program which generalizes data rearrangement.

FIG. 4B shows an example of a program which generalizes this data rearrangement (the example program is in the C language); this program converts the data stored in the data structure shown on the left side in FIG. 4A into the data structure shown on the right side.

Next, the CPU 20 executes control signal data generation processing, based on line control data and on line setting data (see FIG. 5) which has been structure-converted, and generates the control signal data items H to K.

Figure 6:
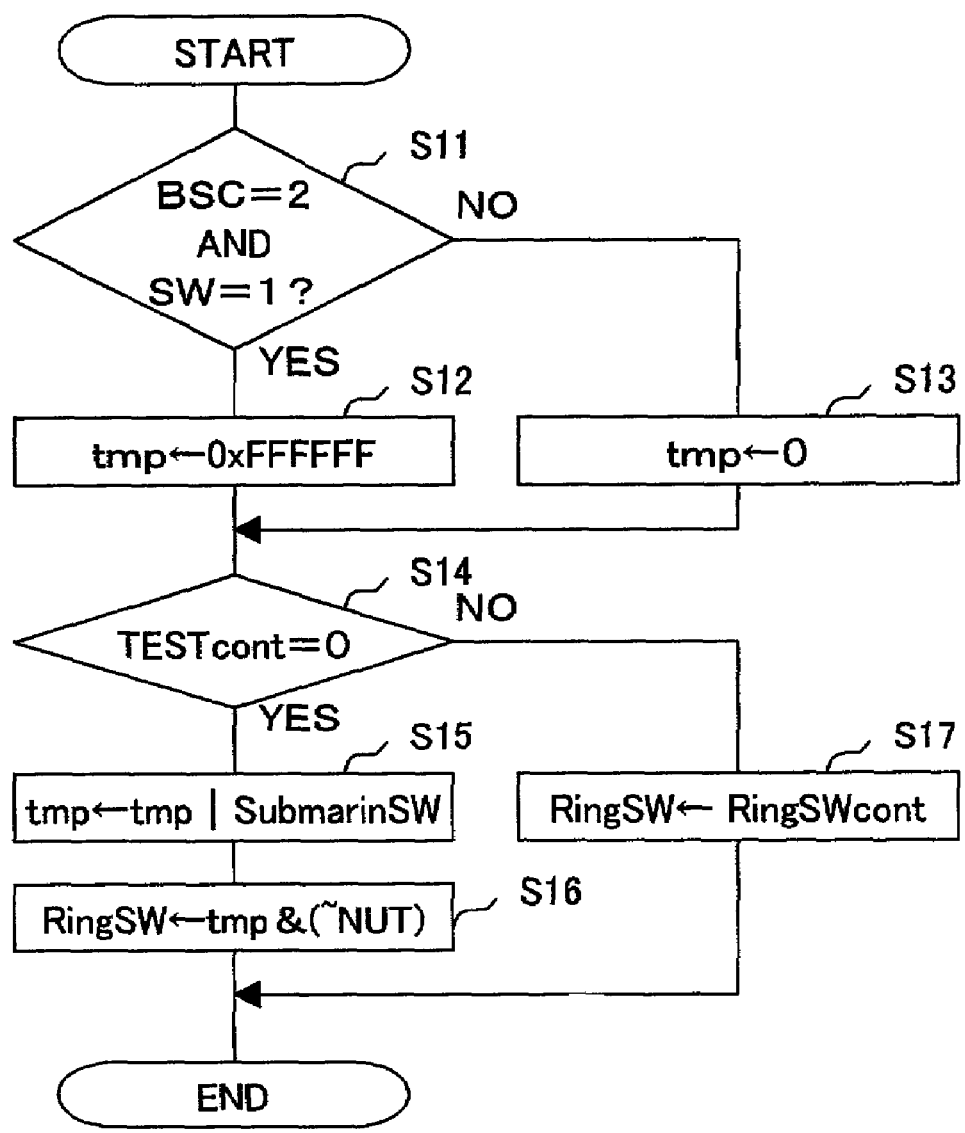
FIG. 6 is a flowchart showing the flow of processing to generate the control signal data H.
Figure 7:
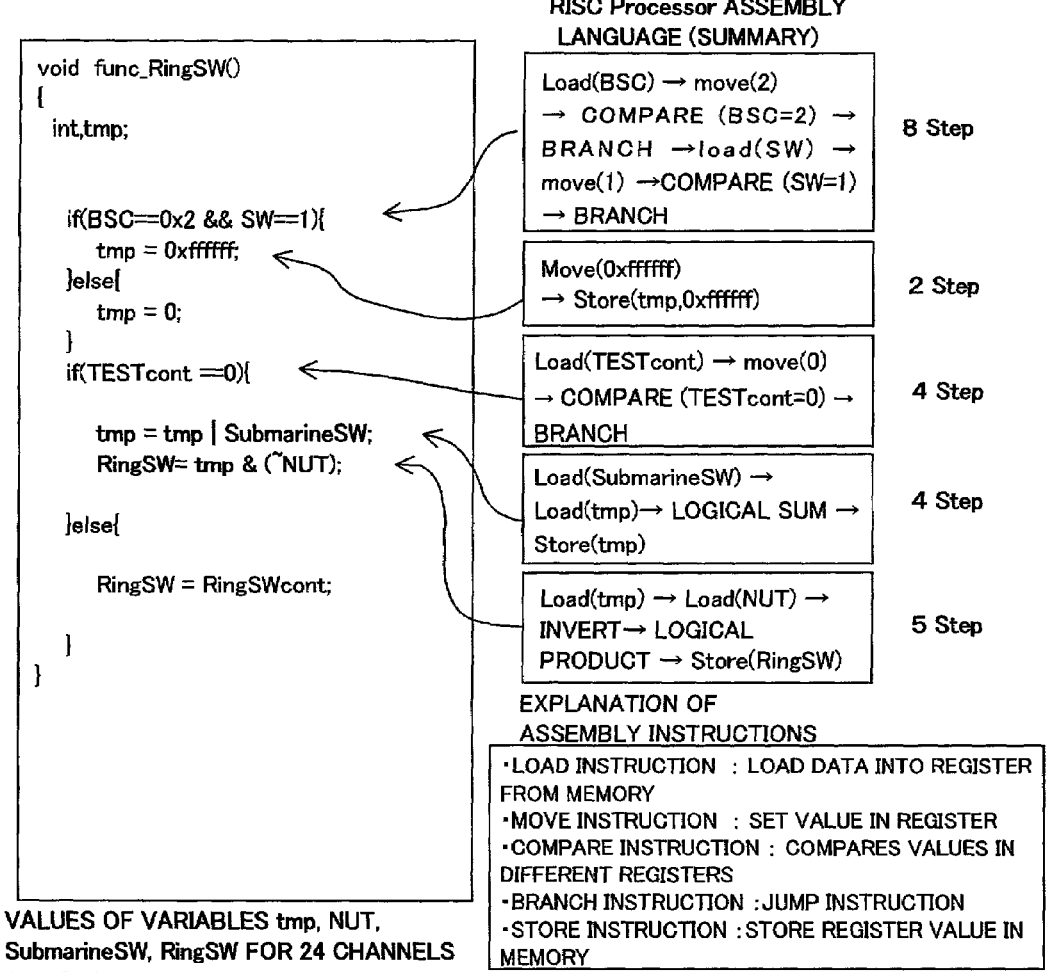
FIG. 7 is an example of a program written in the C language and an example of a program written in assembly language for a RISC processor, corresponding to the flowchart of FIG. 6.

FIG. 6 is a flowchart showing the flow of processing to generate the control signal data H (ring-switch control data). This flowchart also shows processing for the example of the east-side channels ch1 to ch24. FIG. 7 is an example of a program written in the C language and an example of a program written in assembly language for a RISC processor, corresponding to the flowchart of FIG. 6.

First, the CPU 20 judges whether BSC (node fault data A) is equal to 2 and whether SW (ring-switch trigger data C) is equal to 1 (S11).

If BSC is equal to 2 (that is, if a fault has occurred in an east-side channel of the node itself), and SW is also equal to 1 (that is, ring-switching is executed) ("YES" in S11), then the CPU 20 substitutes the hexadecimal constant 0xFFFFFF into the one-word variable tmp (32 bits) for temporary storage (S12).

In other words, the CPU 20 sets each of the lower 24 bits of the variable tmp to "1", and each of the upper 8 bits to "0". On the other hand, if BSC is not equal to 2, or if SW is not equal to 1 ("NO" in S11), the CPU 20 substitutes 0 into the variable tmp, so that all 32 bits of tmp are set to "0" (S13).

Following this, the CPU 20 judges whether TESTcont (control data D for device testing) is equal to 0 (S14).

If TESTcont is equal to 0 (that is, if device testing is not to be performed) ("YES" in S14), the CPU 20 computes the logical sum (logical OR) of the variable tmp and the submarine switching control data F (SubmarineSW) for the east-side channels ch1 to ch24, and assigns the computation result to the variable tmp (S15).

Because, as explained above, the data for the east-side channels ch1 to ch24 is stored in a single (one-word) memory cell, and the variable tmp is also a single word, the logical sum computation is executed by the CPU 20 (specifically, by the ALU) by a single computation (single step). In this way, data for 24 channels can be computed by executing a single step, so that the number of computations is greatly decreased, and processing time is shortened compared with the conventional method.

Next, the CPU 20 computes the logical product (logical AND) of the variable tmp and the result of 0/1 inversion of each bit of the NUT setting data E (NUT) for the channels ch1 to ch24, stores the computation result, as the ring-switch control data H (RingSW) for the east-side channels ch1 to ch24, at address Y (see FIG. 14) of the memory 22 (S16), and ends processing.

This 0/1 inversion processing is also executed by a single computation of the CPU 20, since the NUT setting data E of the channels ch1 to ch24 is stored in a single word. Also, the logical product computation is executed in a single ALU operation. As a result, the number of computations is greatly reduced, and processing time is shortened, compared with the conventional method.

If however in step S14 TESTcont is not equal to 0 (that is, device testing is to be performed) ("NO" in S14), the CPU 20 stores the device testing ring-switch control data G (RingSWcont) for east-side channels ch1 to ch24, without modification, in the ring-switch control data H (RingSW) for east-side channels ch1 to ch24, that is, at address Y of memory 22 (see FIG. 14) (S17).

Here the device testing ring-switch control data G (RingSWcont) for east-side channels ch1 to ch24 is also converted into one-word data, so that processing to store this in memory 22 is also executed in a single operation. By this means the number of processes is reduced, and the processing time is shortened.

As shown in FIG. 7, when converted into the number of operations of the RISC processor (CPU 20), step S11 involves 8 steps; step S12 or step S13 involves 2 steps. Step S14 involves 4 steps, step S15 involves 4 steps, step S16 involves 5 steps, and step S17 involves 2 steps. Hence the total number of steps performed in steps S11, S12, S14, S15, S16 is 23 steps. That is, by means of 23 steps, control signal data for 24 channels is generated.

By this means, even if the number of operations employed in data structure conversion processing in the above-described FIG. 3 is added, the number of operations is reduced, and processing time shortened, compared with the conventional method.

Figures 8, 9:
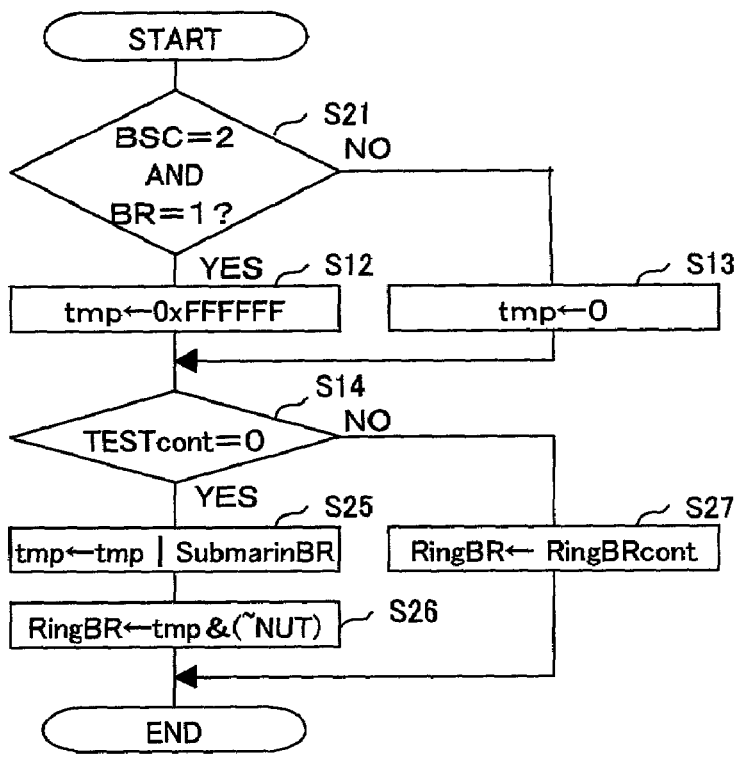
FIG. 8 is a flowchart showing the flow of processing to generate ring-bridge control data I.
FIG. 9 is an example of a program in the C language corresponding to the flowchart of FIG. 8.

Next, processing to generate ring-bridge control data I is explained. FIG. 8 is a flowchart showing the flow of processing to generate ring-bridge control data I. Processing which is the same as in FIG. 6 is assigned the same symbol, and a detailed explanation is omitted. FIG. 9 is an example of a program in the C language corresponding to the flowchart of FIG. 8.

First, the CPU 20 judges whether BSC (node fault data A) is equal to 2, and whether BR (ring-bridge trigger data B) is equal to 1 (S21).

If BSC is equal to 2, and BR is equal to 1 (that is, a ring bridge is executed) ("YES" in S21), the CPU 20 executes step S12; otherwise, step S13 is executed.

Next, the CPU 20 performs the judgment of step S14, and if TESTcont is equal to 0 ("YES" in S14), the logical sum of the variable tmp and the submarine bridge control data S (SubmarineBR) for east-side channels ch1 to ch24 is computed, and the computation result assigned to the variable tmp (S25). This logical sum computation is, similarly to step S15 described above, executed in a single operation of the CPU 20, so that the number of computations is greatly decreased, and the processing time is shortened, compared with the conventional method.

Next, the CPU 20 computes the logical product of the variable tmp and the result of 0/1 bit inversion of each bit of the NUT setting data E (NUT) for channels ch1 to ch24, stores the computation result in the address (Y+2) (see FIG. 14) of the memory 22 as the ring-bridge control data I (RingBR) of east-side channels ch1 to ch24 (S26), and ends processing. Here also, similarly to step S16, the number of computations is greatly decreased and the processing time is shortened, compared with the conventional method.

On the other hand, if in step S14 TESTcont is not equal to 0 ("NO" in S14), the CPU 20 stores the device testing ring-bridge control data T (RingBRcont) for east-side channels ch1 to ch24 without modification in the ring-bridge control data I (RingBR) (address Y+2, see FIG. 14) for east-side channels ch1 to ch24 (S27). Here also, as in step S17, the number of computations is decreased and the processing time is shortened.

As seen in FIG. 9, when converted into the steps of a RISC processor, the processing of the flowchart of FIG. 8 also involves 23 steps.

Figures 10, 11:
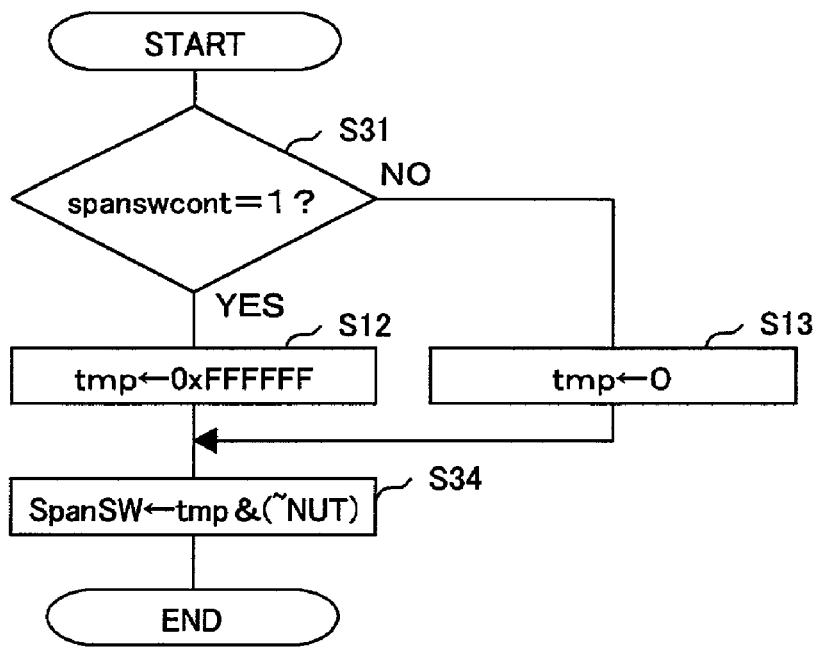
FIG. 10 is a flowchart showing the flow of processing to generate span-switch control data J.
FIG. 11 is an example of a program in the C language corresponding to the flowchart of FIG. 10.

Next, processing to generate the span-switch control data J is explained. FIG. 10 is a flowchart showing the flow of processing to generate span-switch control data J. Processing which is the same as in FIG. 6 is assigned the same symbol, and a detailed explanation is omitted. FIG. 11 is an example of a program in the C language corresponding to the flowchart of FIG. 10.

First, the CPU 20 judges whether Spanswcont (span-switch trigger data X) is equal to 1 (S31). If Spanswcont is equal to 1 (that is, if span-switching is performed) ("YES" in S31), the CPU 20 executes step S12; if not ("NO" in S31), the CPU 20 executes step S13.

Next, the CPU 20 computes the logical product of the variable tmp and the result of 0/1 bit inversion of each bit of the NUT setting data E (NUT) for channels ch1 to ch24, stores the computation result in memory 22 (see FIG. 14) as the span-switch control data J (SpanSW) of east-side channels ch1 to ch24 (S34), and ends processing. Here also, similarly to step S16, the number of computations is greatly decreased and the processing time is shortened, compared with the conventional method.

As is seen from FIG. 11, processing of the flowchart of this FIG. 10, when converted into RISC processor steps, involves 15 steps.

Figures 12, 13:
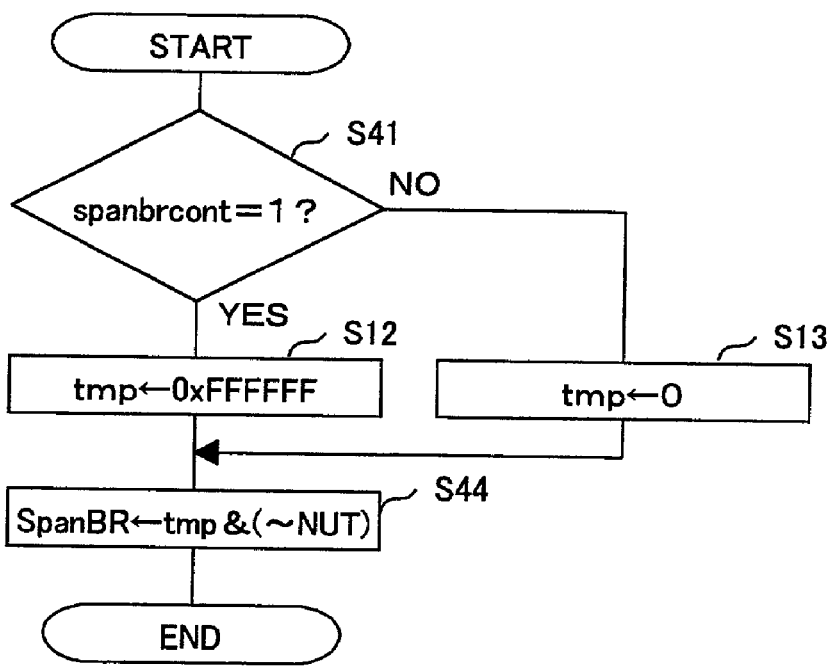
FIG. 12 is a flowchart showing the flow of processing to generate span-bridge control data K.
FIG. 13 is an example of a program in the C language corresponding to the flowchart of FIG. 12.

Next, processing to generate span-bridge control data K is explained. FIG. 12 is a flowchart showing the flow of processing to generate span-bridge control data K. Processing which is the same as in FIG. 6 is assigned the same symbol, and a detailed explanation is omitted. FIG. 13 is an example of a program in the C language corresponding to the flowchart of FIG. 12.

First, the CPU 20 judges whether Spanbrcont (span-bridge trigger data Y) is equal to 1 (S41). If Spanbrcont is equal to 1 (that is, if span-bridging is performed) ("YES" in S41), the CPU 20 executes step S12; if not ("NO" in S41), the CPU 20 executes step S13.

Next, the CPU 20 computes the logical product of the variable tmp and the result of 0/1 bit inversion of each bit of the NUT setting data E (NUT) for channels ch1 to ch24, stores the computation result in memory 22 (see FIG. 14) as the span-bridge control data K (SpanBR) of east-side channels ch1 to ch24 (S44), and ends processing. Here also, similarly to step S16, the number of computations is greatly decreased and the processing time is shortened, compared with the conventional method.

As is seen from FIG. 13, processing of the flowchart of this FIG. 12, when converted into RISC processor steps, involves 15 steps.

FIG. 14 shows control signal data which has been generated in this way and stored in memory 22. This control signal data is read from the other port of the memory 22 and supplied to the PSs 25.

First the east-side span-switch control data J is sent to PS $25_1$, and then the west-side span-switch control data J is sent. That is, the east-side span-switch control data J and the west-side span-switch control data J are output by means of time division. This east-side span-switch control data J and west-side span-switch control data J are input from PS $25_1$ to the span-switch unit 3 (see FIG. 22) as serial data.

In synchronization with PS $25_1$ data output, at the span-switch unit 3, when the east-side span-switch control data J is output from PS $25_1$, the selection circuit 31 and AIS insertion circuit 33 receive the east-side span-switch control data J, and when the west-side span-switch control data J is output from PS $25_1$, the selection circuit 32 and AIS insertion circuit 34 receive west-side span-switch control data J.

Similarly, east-side ring-switch control data H output from PS $25_2$ is received by the selection circuit 41 of the ring-switch unit 4, and west-side ring-switch control data H is received by the selection circuit 42 of the ring-switch unit 4. East-side span-bridge control data K output from PS $25_3$ is received by the selection circuit 51 of the span-bridge unit 5, and west-side span-bridge control data K is received by the selection circuit 52 of the span-bridge unit 5. East-side ring-bridge control data I output from PS $25_4$ is received by the selection circuit 61 of the ring-bridge unit 6, and west-side ring-bridge control data I is received by the selection circuit 62 of the ring-bridge unit 6.

When the value of the input data J is "0", the selection circuits 31 and 32 select and output, for the channel corresponding to the data, the main signal of the channel on the first input (work line) side. On the other hand, when the value of the input data J is "1", the main signal of the second input (protection line) side for the channel corresponding to the data is selected and output.

When the value of the input data J is "0", the AIS insertion circuits 33 and 34 do not output an AIS to the channel corresponding to the data; when the value of the input data J is "1", an AIS is output to the channel corresponding to the data.

Similar operations are performed by the other selection circuits 41, 42, 51, 52, 61 and 62, and by the AIS insertion circuits 33 and 34.

By this means, span-switching and span-bridging, or ring-switching and ring-bridging, are executed.

In this way, by means of this embodiment the number of processing steps is reduced, and the processing time is shortened, in software processing to generate control signal data based on line control data and line setting data provided by the host processor 1. Even if the operating frequency of the CPU 20 (RISC processor) is 100 MHz, switching processing can be completed within an allowable time for switching of 50 milliseconds.

By the way, when there is a change in the data stored in memory 21a, the monitoring device 21c can provide the CPU 20 with an interrupt signal and with data (such as channel number, etc.) indicating the channel in which the change has occurred.

Also, FIG. 5 and FIG. 14 are examples of control data, and there are cases in which other data is stored in "unused" bits. Other data might be, for example, far end node ID information; squelch table information (source-side node IDs, sink-side node IDs and similar needed for squelch judgments); RIP (Ring Interworking on Protection) channel setting information; switch-squelch control information; bridge-squelch control information (squelch: function to insert an AIS for a line causing misconnection); protection through control information; and drop AIS control information (a function to halt adding (ADD) of protection lines when faults occur, and enable pass-through).

Further, the bits of register 21d reflect changes in a total of 48 channels, including 24 east-side channels and 24 west-side channels; but the number of channels change in which is reflected by each bit in the register 21d may be different from this.

Second Embodiment

The control signal data of the first embodiment, shown in FIG. 14, can also be converted into a conventional control signal data structure shown in FIG. 25, and output from PSs 25.

Figure 15:
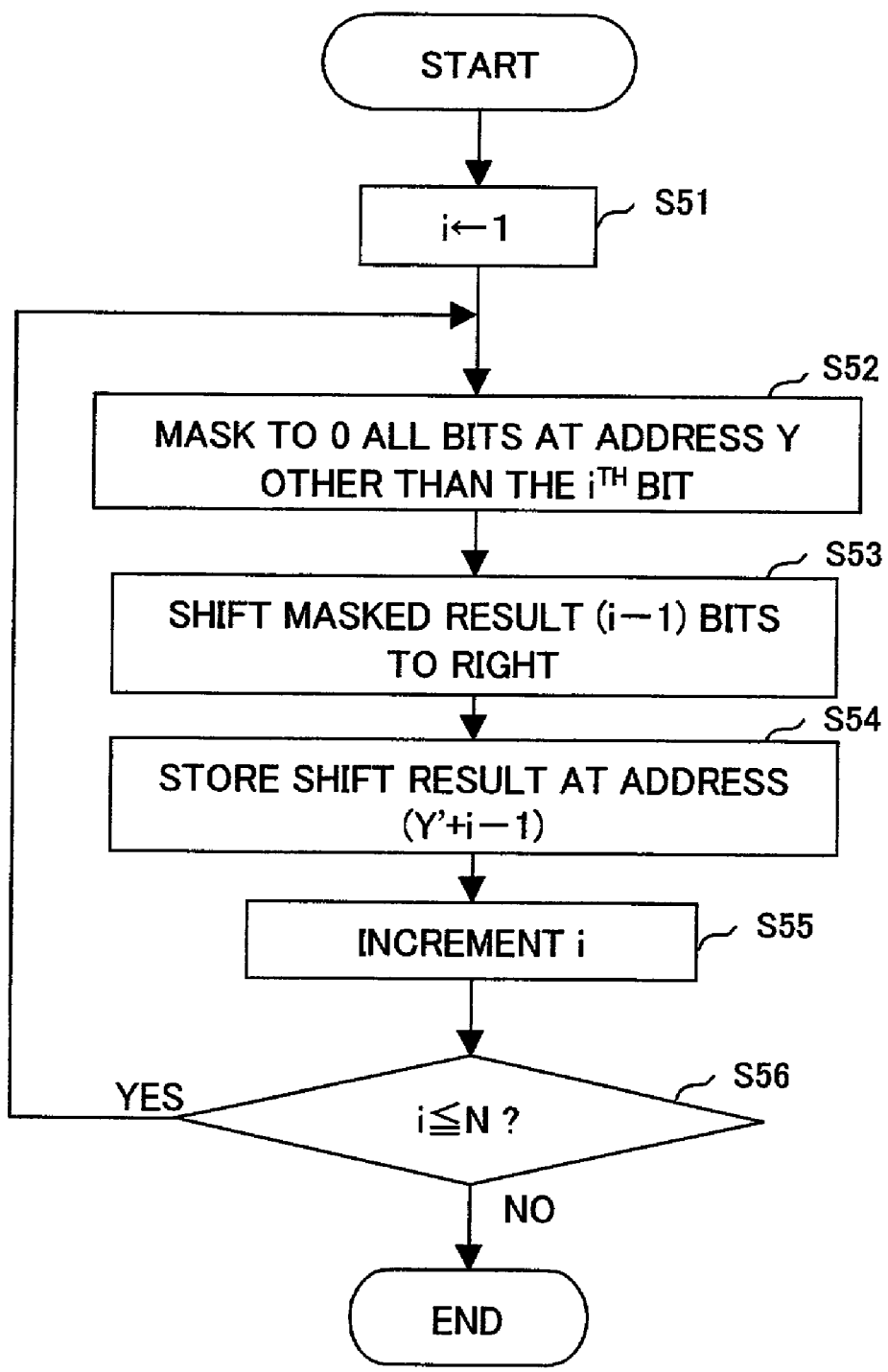
FIG. 15 is a flowchart showing the flow of processing to convert the control signal data shown in FIG. 14 into the control signal data structure shown in FIG. 25.

FIG. 15 is a flowchart showing the flow of processing to convert the control signal data shown in FIG. 14 into the control signal data structure shown in FIG. 25. The processing shown in this flowchart is, as one example, processing to convert east-side ring-switch data H for 24 channels, stored in the memory cell at address Y. This processing is described in a program stored in the instruction storage memory 24, and is executed by the CPU 20.

First, the CPU 20 sets the value of the variable i, which specifies the bit position of the memory cell at address Y in FIG. 14, to 1 (S51). That is, the bit position of the memory cell at address Y is specified as the $i^{th}$ bit.

Next, the CPU 20 masks to 0 the values of bits other than the $i^{th}$ bit in the memory cell at address Y (S52), and right-shifts the result of masking by i bits (S53). By this means, the ring-switch data H of channel chi is moved to the first bit.

Then, the CPU 20 stores the result of shifting in the memory cell at another address (the address is taken to be (Y'+i−1)) (S54). By this means, the ring-switch data H of channel chi is stored in the first (lowermost) bit of one memory cell as shown in FIG. 25.

Next, the CPU 20 increments the variable i by 1 (S55), and compares the variable i and the number of channels N (here N=24) (S56). If i≦N, processing is repeated from step S52, and ring-switch data H for the next channel is processed. If i>N, processing ends. By this means, the east-side ring-switch control data shown in FIG. 14 is substituted in the first bit of 24 consecutive memory cells, as shown in FIG. 25.

Figure 23:
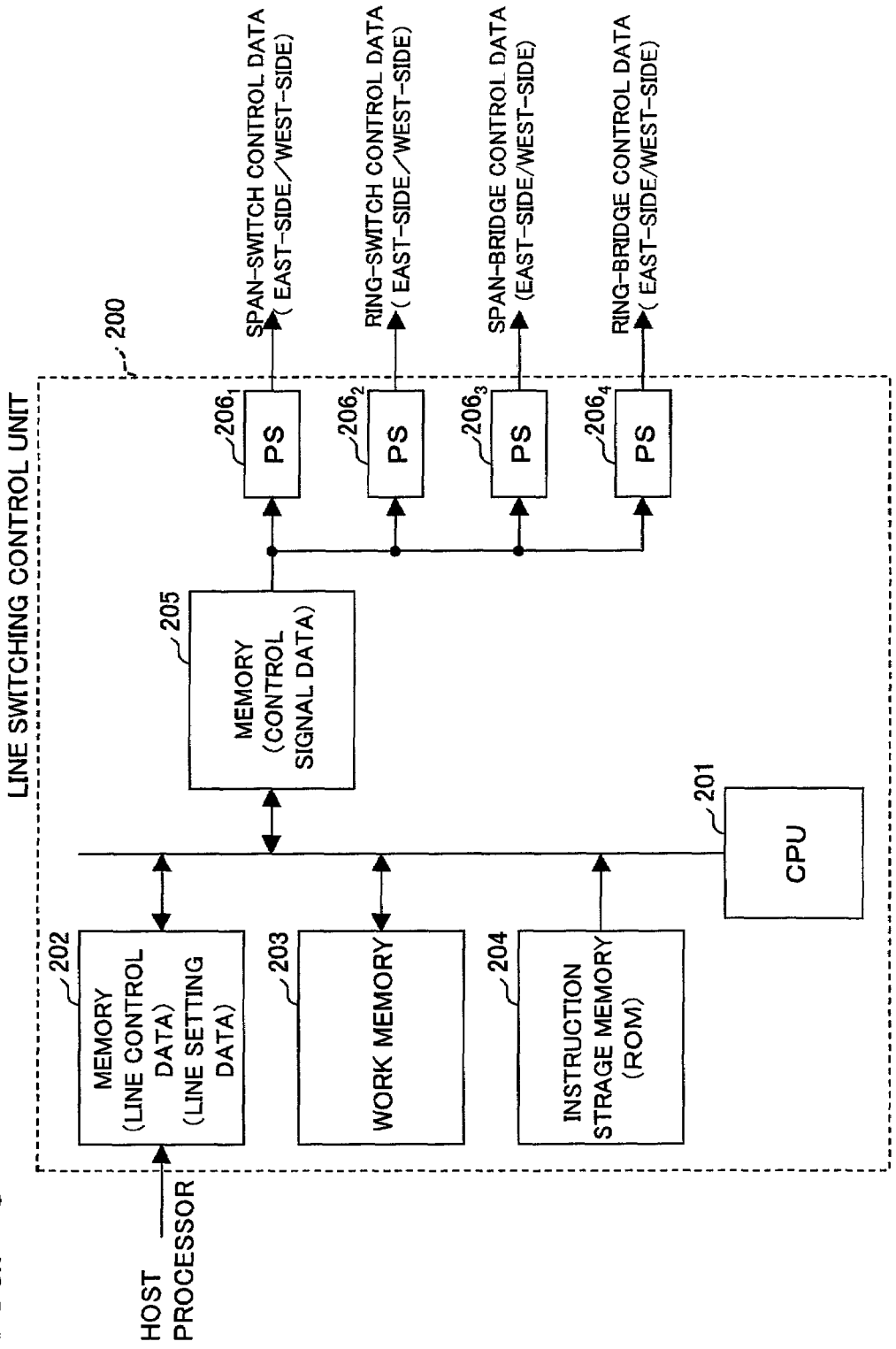
FIG. 23 is a block diagram showing the conventional configuration of the line switching control unit for the case in which processing by the line switching control unit is realized in software.

Thereby, the existing interface between the line switch control unit 2, span-switch unit 3, ring-switch unit 4, span-bridge unit 5, and ring-bridge unit 6 can be used, and the existing PS $206_1$ to $206_4$ shown in FIG. 23 can be used as the PSs 25.

Third Embodiment

Figure 16:
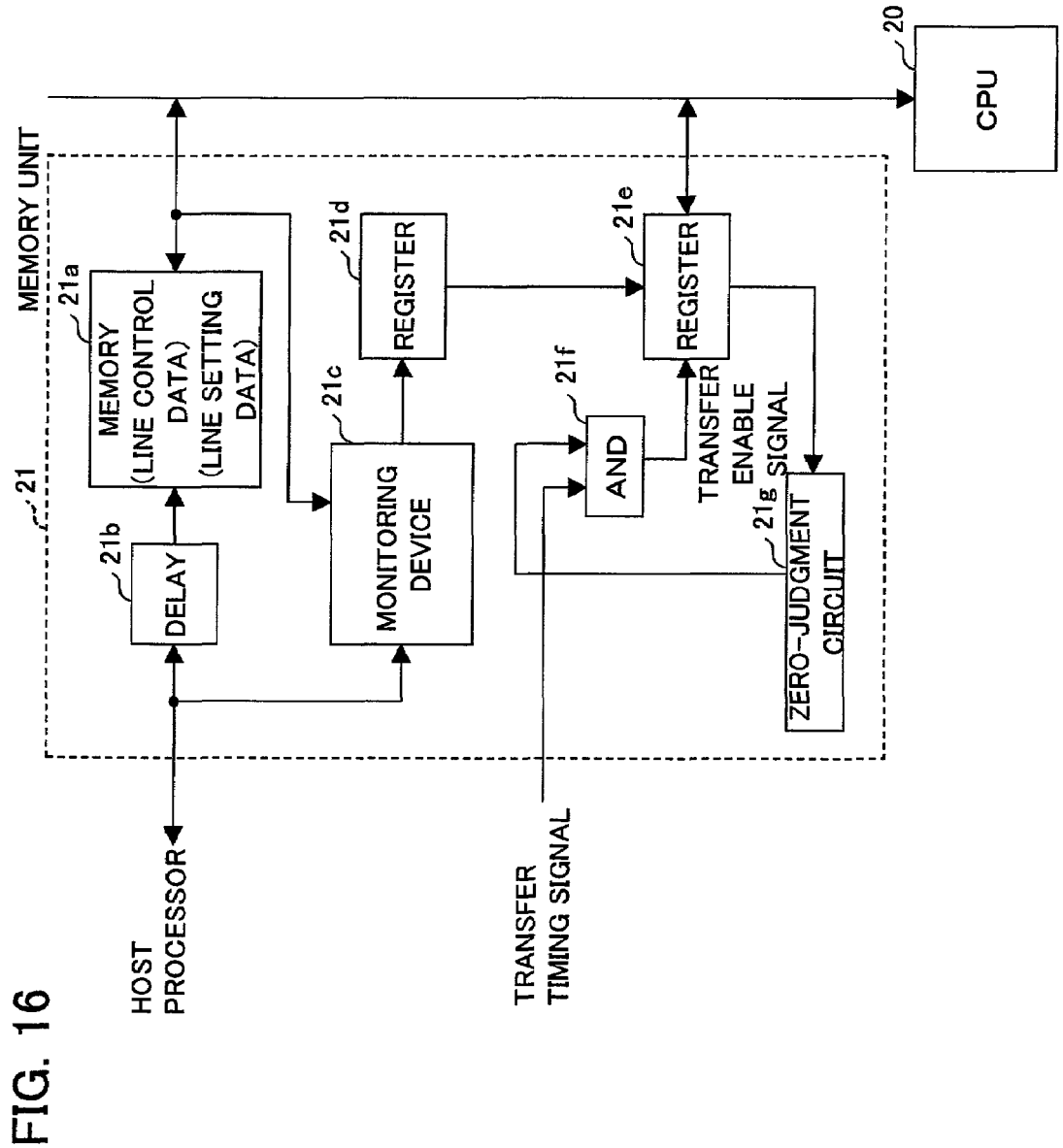
FIG. 16 is a block diagram showing another configuration of the memory unit 21.

The memory unit 21 in the first embodiment can also be configured as shown in FIG. 16. In FIG. 16, component elements which are the same as in FIG. 2 are assigned the same symbols, and detailed explanations are omitted.

This memory unit 21 has a memory 21a; delay element 21b; monitoring device 21c; registers 21d and 21e; an AND gate 21f; and a zero-judgment circuit 21g.

As described in the explanation of the first embodiment, the monitoring device 21c sets to "1" the bits in the register 21d (which is, for example, a 32-bit register) corresponding to line control data and/or line setting data which has changed.

The register 21e has the same number of bits (for example, 32 bits) as the register 21d. A high-level "H" ("1") or low-level "L" ("0") transfer (copy) enable signal is input to the register 21e from the AND gate 21f. When a high-level transfer enable signal is input to the register 21e, the values of all the bits of the register 21d are transferred (copied) to the register 21e (which is written). After the transfer, the value of the register 21d is reset to 0.

The CPU 20 reads the value of the register 21e at prescribed time intervals by polling. Similarly to the first embodiment, the CPU 20 executes processing of line control data and line setting data for channels (48 channels) corresponding to bits of the register 21e set to "1", and generates and outputs control signal data. After the end of this processing, the CPU 20 resets all the bits of the register 21e to 0.

The zero-judgment circuit 21g judges whether the values of all the bits of the register 21e are "0". If all the bits of the register 21e are "0", the zero-judgment circuit 21g outputs a high-level "H" ("1") signal to the AND gate 21f, and if at least one bit of the register 21e is set to "1", outputs a low-level "L" ("0") signal to the AND gate 21f.

In addition to the signal from the zero-judgment circuit 21g, a transfer timing signal (clock signal) at a prescribed frequency (for example, 8 kHz) is also input to the AND gate 21f from an oscillator, not shown.

Only when both the signal from the zero-judgment circuit 21g and the transfer timing signal are at high level does the AND gate 21f output a high-level transfer enable signal to the register 21e; at all other times, a low-level transfer enable signal is output to the register 21e.

A transfer enable signal from the AND gate 21f is input to the register 21e, and so if the value of the register 21e is not 0, the value of the register 21d is not transferred to the register 21e. In other words, after the CPU 20 ends processing of line control data and line setting data for a given channel (48 channels), and the register 21e is reset to 0, the value of the register 21d is transferred to the register 21e.

By this means, the CPU 20 can discriminate the channel (channel group) to be processed through a single polling (because, during processing by the CPU 20, the value of the register 21e does not change), and so processing efficiency can be improved.

Fourth Embodiment

Of the data shown in FIG. 24, the line setting data (E, F, G, and the like) are provided to the line switching control unit 2 even before the node enters the operational state (for example, upon initial settings (provisioning) performed on startup of the node). Thereafter, if a fault occurs during node operation, of the data shown in FIG. 24, line control data (A, B and the like) is provided to the line switching control unit 2.

Even if a fault occurs, there exist many line setting data items which do not change. Hence by executing data conversion processing in advance, when node initial settings are set, the need to perform data conversion processing when a fault occurs is eliminated in cases where there are no changes in line setting data on occurrence of the fault. By this means, the time required for execution of data structure conversion processing during operation can be eliminated, and software-processing time can be shortened.

In other words, when node initial settings are set, if the line setting data (E, F, G, S, T, and similar) is provided by the host processor 1 to the line switching control unit 2, the CPU 20 executes data structure conversion processing of the line setting data (see FIG. 3) as part of this initial setting processing, and stores the converted data in the work memory 23.

After completion of initial settings, the CPU 20 puts the line switching control unit 2 into the operating state (in service).

Thereafter, if a fault occurs while in the operating state, and the host processor 1 provides line control data (A, B, C, and similar) to the memory unit 21 (monitoring device 21c, delay element 21b, memory 21a) of the line switching control unit 2, the memory unit 21 sends an interrupt signal to the CPU 20.

As a result of this interrupt signal, the CPU 20 begins the polling of the above-described second or third embodiment, and executes control signal data generation processing for channels for which a change in the line control data has occurred.

Fifth Embodiment

Figure 17:
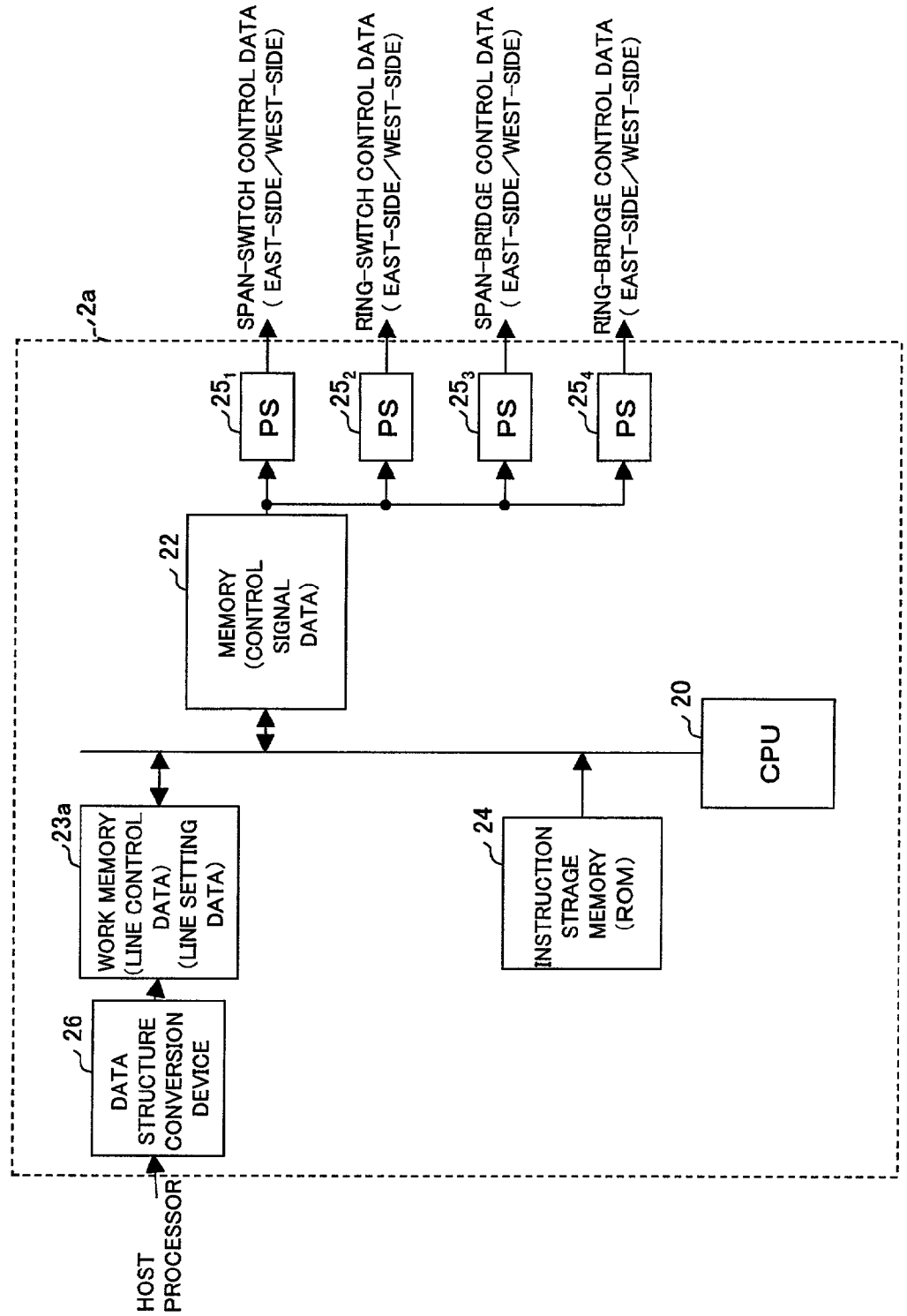
FIG. 17 is a block diagram showing the configuration of the line switching control unit according to the fifth embodiment of the present invention.

In the fifth embodiment, data structure conversion processing is performed by hardware circuitry. FIG. 17 is a block diagram showing the configuration of the line switching control unit 2a of the fifth embodiment. Component elements which are the same as in the line switching control unit 2 of FIG. 1 are assigned the same symbols, and detailed explanations are omitted.

This line switching control unit 2a has a CPU 20; a memory 22; an instruction storage memory 24; a work memory 23a; a data structure conversion device 26; and PS $25_1$ to PS $25_4$.

The work memory 23a differs from the work memory (RAM) 23 of FIG. 1 in that it is two-port RAM.

Figure 18:
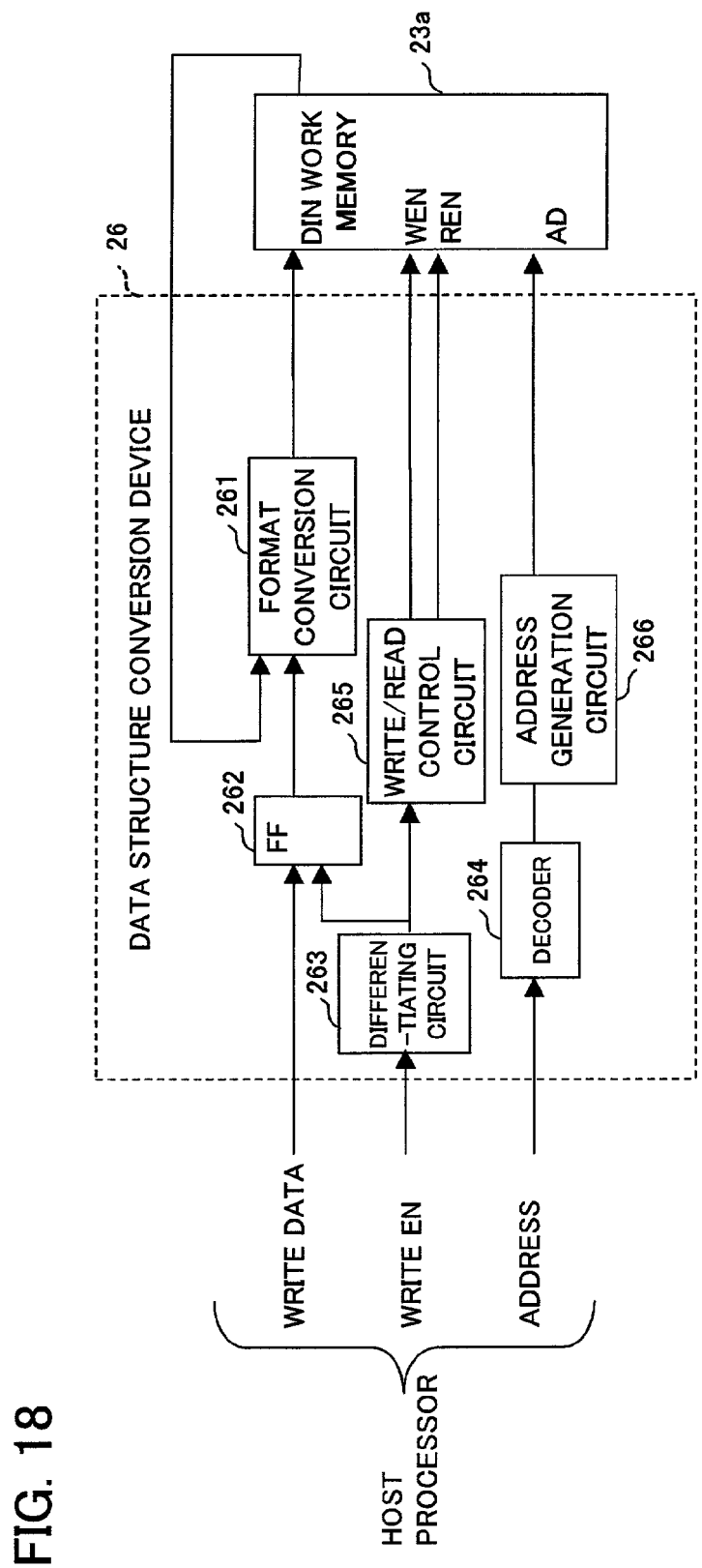
FIG. 18 is a block diagram showing the detailed configuration of the data structure conversion device.

The data structure conversion device 26 employs hardware circuitry to execute the data structure conversion processing that had been executed by software in the first embodiment. FIG. 18 is a block diagram showing the detailed configuration of the data structure conversion device 26.

The data structure conversion device 26 has a format conversion circuit 261; a flip-flop (FF) 262; a differentiating circuit 263; decoder 264; a write/read control circuit 265; and an address generation circuit 266.

The host processor 1 inputs to the data structure conversion device 26 line setting data (write data), an address in work memory 23a to which to write line setting data (write address), and a write enable signal (write EN).

The address is input to the decoder 264. Based on the input address, the decoder 264 generates a leading address for the data group to which the line setting data specified by the address belongs.

Here, if as shown for example in FIG. 24 the line setting data is grouped in 24-channel groups, the "leading address for the data group to which the line setting data specified by the address belongs" is the leading address of this group (the (X+2) address, (X+28) address, and similar in FIG. 24), and this group is called a data group.

For example, when in FIG. 24 any of the addresses from address (X+2) to (X+25) is input to the decoder 264, the leading address (X+2) is output based on this address. Similarly, when any of the addresses (X+28) to (X+51) is input to the decoder 264, the leading address (X+28) is output based on this address.

The address generation circuit 266 outputs to the work memory 23a (to the address input terminal AD), in order, the addresses of the data group, based on the leading address provided by the decoder 264. For example, if the leading address is (X+2), the address generation circuit outputs, in order, the addresses from (X+2) to (X+25). These addresses are used as read addresses for line setting data stored in the work memory 23a.

The write EN signal is input to the differentiating circuit 263. When the differentiating circuit 263 detects a change in the write EN signal (for example, in the case of active-low, the falling edge from high level to low level; in the case of active-high, the rising edge), a trigger signal is output to the FF 262 and write/read control circuit 265.

By means of this trigger signal input, the FF 262 latches (stores) the line setting data (write data) provided by the host processor 1.

By means of this trigger signal input, the write/read control circuit 265 outputs to the work memory 23a (the read enable terminal REN) read enable signals in synchronization with the output of the read address by the address generation circuit 266, in a number equal to the number of read addresses output by the address generation circuit 266.

As a result of the read addresses output by the address generation circuit 266 and the read enable signals output by the write/read control circuit 265, line setting data is read in order from the work memory 23a. For example, line setting data is read in order for 24 channels, from the address (X+2) to the address (X+25).

The line setting data read in this way is input to the format conversion circuit 261. Data latched by the FF 262 is also input to the format conversion circuit 261.

The format conversion circuit 261 converts the plurality of line setting data items (for 24 channels) input from work memory 23a and the FF 262 into a single word of data, as shown in FIG. 5, and outputs the converted data word to work memory 23a.

The address generation circuit 266 outputs to work memory 23a (the address input terminal AD) the address to which to write the converted data (for example, address Z in FIG. 5), in synchronization with the output of converted data by the format conversion circuit 261.

The write/read control circuit 265 outputs to work memory 23a (the write enable input terminal WEN) a write enable signal, in synchronization with the output of converted data by the format conversion circuit 261.

By this means, one word of line setting data with data structure converted is stored in the work memory 23a.

After conversion, when the format conversion circuit 261 or similar sends an interrupt signal to the CPU 20, the CPU 20 can execute control signal data generation processing.

In this embodiment, data structure conversion processing is executed by hardware circuitry, so that data structure conversion processing can be executed more rapidly. In addition, the work memory 23a is used both as the memory unit 21 (memory 21a) and as work memory 23, so that the amount of hardware can be reduced.

By the way, the line control data does not require data structure conversion, and so is either written to the work memory 23a without being converted by the format conversion circuit 261, or else is written to the work memory 23a by bypassing the data structure conversion device 26.

Also, by providing hardware to perform processing which is the inverse of this line setting data structure conversion, processing to convert the data structure of the control signal data shown in FIG. 14 into the data structure shown in FIG. 25 can be executed by hardware circuitry.

Sixth Embodiment

Hardware circuitry for data structure conversion processing can also be incorporated within the CPU 20.

In general, the CPU has a source register, an ALU, and a destination register; processing is repeated in which the data stored in the source register is operated on by the ALU, and the operation result is stored in the destination register.

Figure 19:
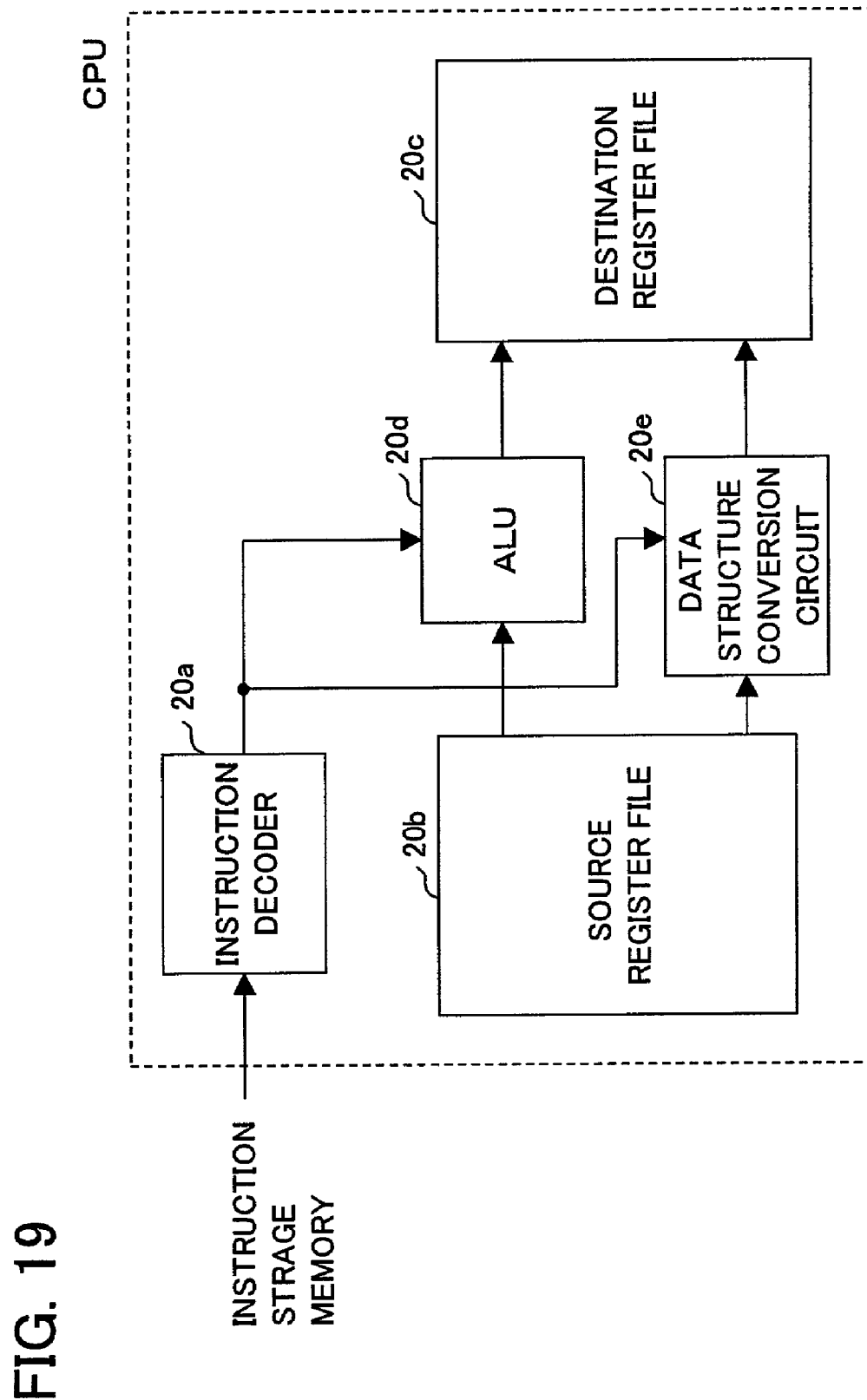
FIG. 19 is a block diagram showing in summary the configuration of a CPU which incorporates data structure conversion processing circuitry between a source register and a destination register.
Figure 20:
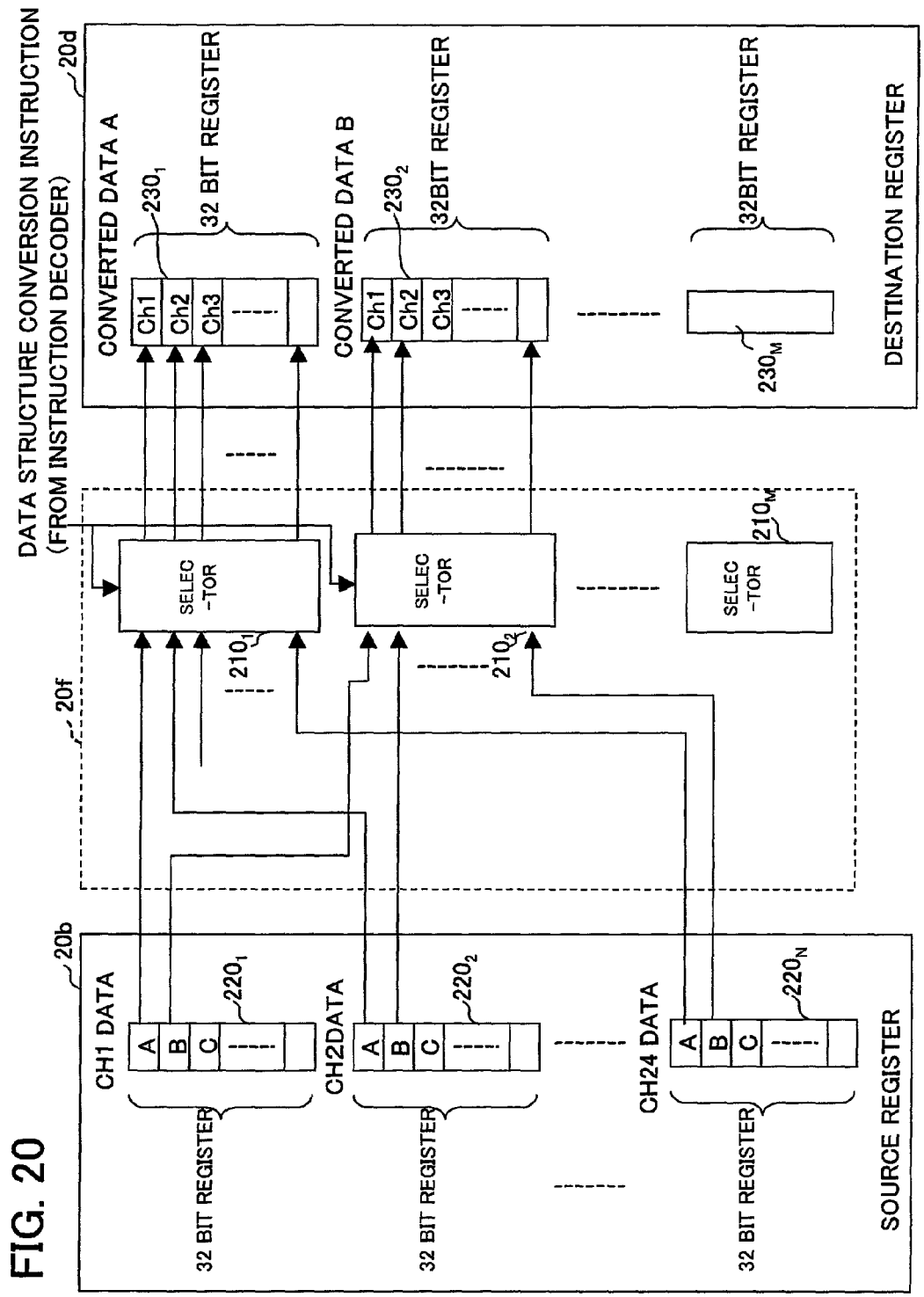
FIG. 20 is a block diagram showing the detailed configuration of the data structure conversion processing circuitry.

Data structure conversion processing circuitry can be incorporated between the source register and the destination register. FIG. 19 is a block diagram showing in summary the configuration of a CPU which incorporates data structure conversion processing circuitry between the source register and destination register. FIG. 20 is a block diagram showing the detailed configuration of the data structure conversion processing circuitry.

The CPU has an instruction decoder 20a, a source register file 20b, a destination register file 20c, an ALU 20d, and a data structure conversion circuit 20e.

A data structure conversion instruction, which causes the data structure conversion circuit 20e to execute data structure conversion processing, is added to the CPU instruction set.

When this data structure conversion instruction is sent to the CPU, the instruction decoder 20g decodes this instruction and sends it to the data structure conversion circuit 20e.

As shown in FIG. 20, the data structure conversion circuit 20e has at least M selectors $210_1$ to $210_M$ (where M is the number of line setting data items; in FIG. 24, M=5).

The source register file 20b has at least N registers $220_1$ to $220_N$ (where N is the number of channels; in FIG. 24, N=24). Each register $220_1$ to $220_N$ has 32 bits.

The CPU stores line setting data for each channel in the registers $220_1$ to $220_N$. For example, in the example shown in FIG. 24, line setting data for the east-side channels ch1 to ch24 is stored in the registers $220_1$ to $220_N$ respectively.

The first bit of data in each of the registers $220_1$ to $220_N$ is provided to the selector $210_1$. Similarly, the second through $M^{th}$ bits of data in the registers $220_1$ to $220_N$ are provided to the selectors $210_2$ to $210_M$.

The destination register file 20d has at least M registers $230_1$ to $230_M$. Each of the registers $230_1$ to $230_M$ has 32 bits.

An instruction from the instruction decoder 20a is input to the selectors $210_1$ to $210_M$. When an instruction from the instruction decoder 20a is input to each of the selectors $210_1$ to $210_M$, the selectors $210_1$ to $210_M$ each output data from the registers $220_1$ to $220_N$ to the registers $230_1$ to $230_M$. At this time, the selectors $210_1$ to $210_M$ store data (one bit of data) from the register $220_i$ (where i is an integer from 1 to N) in the $i^{th}$ bit of the registers $230_1$ to $230_M$. By this means, data structure conversion processing is executed.

In this way, by incorporating a data structure conversion circuit within the CPU and providing a data structure conversion instruction in the CPU instruction set, the software-processing overhead due to data structure conversion can be reduced.

This data structure conversion circuit 20e can also be mounted as a circuit external to the CPU, similarly to a CPU coprocessor.

It is also possible to configure hardware circuitry to perform processing to convert the data structure of the control signal data shown in FIG. 14 into the data structure shown in FIG. 25, to be positioned in the CPU between the source register file 20b and the destination register file 20c, or to be mounted externally like a coprocessor.

Other Embodiments

The line setting unit 2 was explained separately from the host processor 1; however, it is also possible to have the host processor execute the processing of the line setting unit 2, and eliminate the line setting unit 2.

As described above, by means of this invention, the number of processing steps in a transmission device can be reduced, and the time required for processing can be shortened. Further, because functions can be realized in software, it is possible to develop, at low cost and in a short period of time, a system which can respond flexibly to changes in specifications, while maintaining processing performance.

What is claimed is:

1. A transmission device for performing prescribed processing on signals of a plurality of channels and transmitting the signals of the plurality of channels, comprising:

a first storage unit storing first control data for the plurality of channels in different memory cells for each channel, each first control data for each channel having one or more types of first control data elements for each channel configured as at least one word data, wherein said storage unit stores at least two types of first control data elements for at least one of the plurality of channels;

a first data structure conversion unit selecting first control data elements of the same type from said first control data stored in said first storage unit, and converting the structure of said first control data such that the first control data elements of the same type are configured as one word data;

a data generation unit for processing, in word units, said first control data converted by said first data structure conversion unit, and generating, from the converted first control data, second control data necessary for said prescribed processing; and a selection unit selecting one or more signals for the plurality of the channels on the basis of said second control data, and transmitting said selected signals for the plurality of channels.

2. The transmission device according to claim 1, wherein said second control data has, within one word, second control data elements for the plurality of channels, and said transmission device further comprises a second data structure conversion unit for converting the structure of said second control data such that the second control data elements for the plurality of channels contained in one word of said second control data are configured as data in different words.

3. The transmission device according to claim 1, further comprising a monitoring unit for monitoring a change in said first control data stored in said first storage unit, and, when there is a change in said first control data, notifying said first data structure conversion unit of the change; and wherein said first data structure conversion unit and said data generation unit each begin processing as a result of notification by said monitoring unit.

4. The transmission device according to claim 3, wherein said monitoring unit notifies said first data structure conversion unit of information indicating a channel corresponding to said first control data which has changed, and said first data structure conversion unit and said data generation unit each perform processing of first control data for the channel indicated by information in the notification from said monitoring unit.

5. The transmission device according to claim 4, further comprising a second storage unit having memory cells corresponding to each channel; and wherein said monitoring unit writes to a memory cell of said second storage unit corresponding to the channel of said first control data which has changed, data indicating that said change has occurred, and said first data structure conversion unit reads said second storage unit at prescribed time intervals, and detects said changes based on the data indicating that said change has occurred.

6. The transmission device according to claim 5, further comprising a third storage unit having memory cells corresponding to each channel, and to which the data of said second storage unit is transferred when the contents of each memory cell of said third storage unit are cleared; and wherein said first data structure conversion unit reads said third storage unit at prescribed time intervals and detects said change, and said first data conversion unit or said data generation unit clears the contents of each storage cell of said third storage unit after the end of processing.

7. The transmission device according to claim 1, wherein said first control data is stored in said first storage unit before the transmission device enters the operating state, and said first data structure conversion unit executes said processing before the transmission device enters said operating state.

8. The transmission device according to claim 1, wherein the transmission device is a node in an optical bi-directional line switched ring system, in which a plurality of nodes are connected by optical transmission lines;
said first control data has line setting data which controls processing including switching of each of said channels in said optical bi-directional line switched ring system; and
said second control data has data indicating how switching is to be performed for each channel in said optical bi-directional line switched ring system.

9. The transmission device according to claim 1, wherein said first data structure conversion unit is constituted by hardware circuitry provided within a central processing unit, or by a coprocessor of the central processing unit.

10. The transmission device according to claim 2, wherein said second data structure conversion unit is constituted by hardware circuitry provided within a central processing unit, or by a coprocessor of the central processing unit.

11. A data processing method in a transmission device for performing prescribed processing of signals for a plurality of channels and transmitting signals over the plurality of channels, comprising steps of:
storing first control data for the plurality of channels in different memory cells for each channel, each first control data for each channel having one or more types of control data elements for each channel configured as at least one word data, wherein at least two types of first control data elements are stored for at least one of the plurality of channels;
selecting control data elements of the same type from said first control data stored in said memory cells;
converting the structure of said first control data such that the control data elements of the same type are configured as one word data;
processing the first control data after said conversion in word units;
generating, from the converted first control data, second control data necessary for said prescribed processing;
selecting one or more signals for the plurality of the channels on the basis of said second control data; and
transmitting said selected signals for the plurality of channels.

12. A data conversion method in a computer comprising the steps of: storing first control data for a plurality of channels in different memory cells for each channel, each first control data for each channel having one or more types of control data elements for each channel configured as at least one word data, wherein at least two types of first control data elements are stored for at least one of the plurality of channels; selecting control data elements of the same type from said first control data stored in said storage cells; converting the structure of said first control data such that the control data elements of the same type are configured in one word data, selecting one or more signals for the plurality of the channels on the basis of said converted first control data; and transmitting said selected signals for the plurality of the channels.

13. A computer readable recording media having recorded thereon a program to be executed by a computer in a transmission device for performing prescribed processing of signals of a plurality of channels and transmitting signals over the plurality of channels, the program being executed by the computer to perform the steps of: reading first control data for the plurality of channels from a memory storing said first control data for the plurality of channels in different memory cells for each channel, each first control data for each channel having one or more types of control data elements for each channel configured as at least one word data, wherein at least two types of first control data elements are stored for at least one of the plurality of channels; selecting control data elements of the same type from said first control data stored in said memory cells; converting the structure of said first control data such that the control data elements of the same type are configured as one word data; processing said converted first control data in word units, and generating, from said converted first control data, second control data necessary for said prescribed processing; selecting one or more signals for the plurality of the channels on the basis of said second control data; and transmitting said selected signals for the plurality of channels.

14. A computer readable recording media having stored thereon a program to be executed by a computer to perform a data processing method, the method comprising steps of: reading first control data for a plurality of channels from a memory storing said first control data for the plurality of channels in different memory cells for each channel, each first control data for each channel having one or more types of control data elements for each channel configured as at least one word data, wherein at least two types of first control data elements are stored for at least one of the plurality of channels; selecting control data elements of the same type from said first control data stored in said memory cells; converting the structure of said first control data such that the control data elements of the same type are configured as one word data, selecting one or more signals for the plurality of the channels on the basis of said converted first control data; and transmitting said selected signals for the plurality of channels.

* * * * *